United States Patent
Ni et al.

(10) Patent No.: US 12,075,499 B2
(45) Date of Patent: Aug. 27, 2024

(54) BLUETOOTH RECONNECTION METHOD AND RELATED APPARATUS

(71) Applicant: HUAWEI TECHNOLOGIES CO., LTD., Guangdong (CN)

(72) Inventors: Guanjun Ni, Shanghai (CN); Yuhong Zhu, Shanghai (CN); Jianxin Lin, Shenzhen (CN); Xiaoqiang Zhang, Shenzhen (CN); Jiongjin Su, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 362 days.

(21) Appl. No.: 17/640,519

(22) PCT Filed: Sep. 3, 2020

(86) PCT No.: PCT/CN2020/113271
§ 371 (c)(1),
(2) Date: Mar. 4, 2022

(87) PCT Pub. No.: WO2021/043219
PCT Pub. Date: Mar. 11, 2021

(65) Prior Publication Data
US 2022/0369394 A1    Nov. 17, 2022

(30) Foreign Application Priority Data
Sep. 6, 2019 (CN) .......................... 201910844046.4

(51) Int. Cl.
*H04W 76/14* (2018.01)
*H04W 68/00* (2009.01)
(Continued)

(52) U.S. Cl.
CPC .......... *H04W 76/14* (2018.02); *H04W 68/00* (2013.01); *H04W 76/15* (2018.02); *H04W 76/19* (2018.02); *H04W 76/34* (2018.02)

(58) Field of Classification Search
None
See application file for complete search history.

(56) References Cited

U.S. PATENT DOCUMENTS

| | | |
|---|---|---|
| 2009/0186580 A1 | 7/2009 | Kim |
| 2014/0254818 A1 | 9/2014 | Tse et al. |
| 2017/0257761 A1* | 9/2017 | Rodriguez .............. H04L 67/12 |

FOREIGN PATENT DOCUMENTS

| | | |
|---|---|---|
| CN | 106617580 A | 5/2017 |
| CN | 106998511 A | 8/2017 |

(Continued)

*Primary Examiner* — Suhail Khan
(74) *Attorney, Agent, or Firm* — WOMBLE BOND DICKINSON (US) LLP

(57) ABSTRACT

This application discloses a Bluetooth reconnection method, and relates to the field of short-range wireless communications technologies. The method includes: When a charging case is closed, a first earbud breaks a Bluetooth connection, where the first earbud stores a Bluetooth address of a terminal and a Bluetooth address of a second earbud. When the charging case is opened, the charging case accommodates only the first earbud, and a first preset condition is met, the first earbud sends a first paging request to the second earbud based on the Bluetooth address of the second earbud. The first preset condition is that the Bluetooth connection includes a Bluetooth connection between the first earbud and the second earbud. In this way, reconnection duration of the first earbud when the charging case is opened can be reduced.

20 Claims, 14 Drawing Sheets

(51) Int. Cl.
*H04W 76/15* (2018.01)
*H04W 76/19* (2018.01)
*H04W 76/34* (2018.01)

(56) References Cited

FOREIGN PATENT DOCUMENTS

| | | |
|---|---|---|
| CN | 107770758 A | 3/2018 |
| CN | 109195055 A | 1/2019 |
| CN | 109451474 A | 3/2019 |
| CN | 109495850 A | 3/2019 |
| CN | 109547884 A | 3/2019 |
| CN | 109743654 A | 5/2019 |
| CN | 110191442 A | 8/2019 |
| TW | 201921958 A | 6/2019 |

\* cited by examiner

BLUETOOTH RECONNECTION METHOD AND RELATED APPARATUS

CROSS-REFERENCE TO RELATED APPLICATIONS

This application is a national stage of International Application No. PCT/CN2020/113271, filed on Sep. 3, 2020, which claims priority to Chinese Patent Application No. 201910844046.4, filed on Sep. 6, 2019. Both of the aforementioned applications are hereby incorporated by reference in their entireties.

TECHNICAL FIELD

This application relates to the field of short-range wireless communications technologies, and in particular, to a Bluetooth reconnection method and a related apparatus.

BACKGROUND

With the development of wireless communications technologies, people have become accustomed to connecting different intelligent terminal devices in a wireless manner. As a mature short-range wireless communications technology at present, a Bluetooth technology is widely used in intelligent terminal devices, for example, a connection between a smartphone and a Bluetooth device such as a Bluetooth headset or a Bluetooth speaker through Bluetooth.

Currently, true wireless stereo (TWS) Bluetooth headsets are developed rapidly. A TWS headset includes a primary earbud and a secondary earbud. Terminals such as a mobile phone and a tablet may be connected to the primary earbud, and then the primary earbud is connected to the secondary earbud through Bluetooth, to achieve true Bluetooth wireless separation of audio-left and audio-right channels for use. When the two earbuds of the TWS headset are in a charging case, a Bluetooth connection between the two earbuds is first completed when a user opens the charging case for use. Then, the primary earbud is connected to a terminal. When the user opens the charging case again after the TWS headset is used and only one earbud is placed into the charging case, the earbud in the charging case reconnects to the other earbud. If the other earbud is not around the charging case or is lost, the earbud in the charging case reconnects to the terminal only after connecting to the other earbud expires. As a result, the earbud in the charging case takes a long time to reconnect to the terminal and work properly, which is not good for user experience.

SUMMARY

This application provides a Bluetooth reconnection method and a related apparatus. Whether to preferentially reconnect to a terminal or preferentially reconnect to a second earbud paired with a first earbud after a charging case is opened may be selected based on a usage status of the first earbud before the charging case is closed. In this way, reconnection duration of the first earbud when the charging case is opened can be reduced.

According to a first aspect, a Bluetooth reconnection method is provided, including: applied to a Bluetooth system, where the Bluetooth system includes a terminal, a first earbud, a second earbud, and a charging case, and the charging case is configured to accommodate the first earbud and the second earbud. When the charging case is closed, the first earbud breaks a Bluetooth connection, where the first earbud stores a Bluetooth address of the terminal and a Bluetooth address of the second earbud. When the charging case is opened, the charging case accommodates only the first earbud, and a first preset condition is met, the first earbud sends a first paging request to the second earbud based on the Bluetooth address of the second earbud. The first preset condition is that the Bluetooth connection includes a Bluetooth connection between the first earbud and the second earbud.

In an embodiment, when the charging case accommodating only the first earbud is opened, the first earbud may determine whether the first earbud establishes a Bluetooth connection to only the second earbud or establishes Bluetooth connections to both the second earbud and the terminal when the first earbud is placed into the charging case and the charging case is closed. If the first earbud establishes the Bluetooth connection to only the second earbud or establishes the Bluetooth connections to both the second earbud and the terminal when the charging case is closed, the first earbud preferentially reconnects to the second earbud. If the first earbud does not establish the Bluetooth connection to the second earbud when the charging case is closed, the first earbud preferentially reconnects to the terminal. In this way, reconnection duration can be reduced, and user experience is improved.

In an embodiment, when the charging case is opened, the charging case accommodates only the first earbud, and the first preset condition is not met, the first earbud sends a second paging request to the terminal based on the Bluetooth address of the terminal. In this way, reconnection duration of the first earbud when the charging case accommodating a single earbud is opened can be reduced.

In an embodiment, when the charging case is opened, the charging case accommodates the first earbud, and the first earbud is in a monaural working mode, the first earbud sends a second paging request to the terminal based on the Bluetooth address of the terminal. In this way, when the first earbud is in the monaural working mode, the first earbud may preferentially reconnect to the terminal when the charging case accommodating a single earbud is opened, to reduce reconnection duration of the first earbud when the charging case accommodating the single earbud is opened.

In an embodiment, when the charging case is opened and the charging case accommodates the first earbud and the second earbud, the first earbud sends the first paging request to the second earbud based on the Bluetooth address of the second earbud. In this way, when the charging case accommodating two earbuds is opened, the first earbud may preferentially reconnect to the second earbud, to reduce reconnection duration of the first earbud.

In an embodiment, when the charging case is opened and the charging case accommodates the first earbud and a third earbud, the first earbud sends a second paging request to the terminal based on the Bluetooth address of the terminal, where the first earbud is not paired with the third earbud. In this way, reconnection duration of the first earbud can be reduced.

In an embodiment, after the first earbud sends the first paging request to the second earbud based on the Bluetooth address of the second earbud, when the first earbud does not receive, within first preset time, a first paging response sent by the second earbud, the first earbud sends a second paging request to the terminal based on the Bluetooth address of the terminal. In this way, the first earbud may reconnect to the terminal when reconnecting to the second earbud expires, to improve a reconnection success rate.

In an embodiment, after the first earbud sends the second paging request to the terminal based on the Bluetooth address of the terminal, when the first earbud does not receive, within second preset time, a second paging response sent by the terminal, the first earbud sends the first paging request to the second earbud based on the Bluetooth address of the second earbud. In this way, the first earbud may reconnect to the second earbud when reconnecting to the terminal expires, to improve a reconnection success rate.

According to a second aspect, this application provides a Bluetooth system. The Bluetooth system includes a terminal, a first earbud, a second earbud, and a charging case. The first earbud is configured to: when the charging case is closed, break a Bluetooth connection, where the first earbud stores a Bluetooth address of the terminal and a Bluetooth address of the second earbud. The first earbud is further configured to: when the charging case is opened, the charging case accommodates only the first earbud, and a first preset condition is met, send a first paging request to the second earbud based on the Bluetooth address of the second earbud. The first preset condition is that the Bluetooth connection includes a Bluetooth connection between the first earbud and the second earbud.

In an embodiment, when the charging case accommodating only the first earbud is opened, the first earbud may determine whether the first earbud establishes a Bluetooth connection to only the second earbud or establishes Bluetooth connections to both the second earbud and the terminal when the first earbud is placed into the charging case and the charging case is closed. If the first earbud establishes the Bluetooth connection to only the second earbud or establishes the Bluetooth connections to both the second earbud and the terminal when the charging case is closed, the first earbud preferentially reconnects to the second earbud. If the first earbud does not establish the Bluetooth connection to the second earbud when the charging case is closed, the first earbud preferentially reconnects to the terminal. In this way, reconnection duration can be reduced, and user experience is improved.

In an embodiment, the first earbud is further configured to: when the charging case is opened, the charging case accommodates only the first earbud, and the first preset condition is not met, send a second paging request to the terminal based on the Bluetooth address of the terminal. In this way, reconnection duration can be reduced, and user experience is improved.

In an embodiment, the first earbud is further configured to: when the charging case is opened, the charging case accommodates the first earbud, and the first earbud is in a monaural working mode, send a second paging request to the terminal based on the Bluetooth address of the terminal. In this way, when the first earbud is in the monaural working mode, the first earbud may preferentially reconnect to the terminal when the charging case accommodating a single earbud is opened, to reduce reconnection duration of the first earbud when the charging case accommodating the single earbud is opened.

In an embodiment, the first earbud is further configured to: when the charging case is opened and the charging case accommodates the first earbud and the second earbud, send the first paging request to the second earbud based on the Bluetooth address of the second earbud. In this way, when the charging case accommodating two earbuds is opened, the first earbud may preferentially reconnect to the second earbud, to reduce reconnection duration of the first earbud.

In an embodiment, the first earbud is further configured to: when the charging case is opened and the charging case accommodates the first earbud and a third earbud, send a second paging request to the terminal based on the Bluetooth address of the terminal, where the first earbud is not paired with the third earbud. In this way, reconnection duration of the first earbud can be reduced.

In an embodiment, the first earbud is further configured to: after sending the first paging request to the second earbud based on the Bluetooth address of the second earbud, when the first earbud does not receive, within first preset time, a first paging response sent by the second earbud, send a second paging request to the terminal based on the Bluetooth address of the terminal. In this way, the first earbud may reconnect to the terminal when reconnecting to the second earbud expires, to improve a reconnection success rate.

In an embodiment, the first earbud is further configured to: after sending the second paging request to the terminal based on the Bluetooth address of the terminal, when the first earbud does not receive, within second preset time, a second paging response sent by the terminal, send the first paging request to the second earbud based on the Bluetooth address of the second earbud. In this way, the first earbud may reconnect to the second earbud when reconnecting to the terminal expires, to improve a reconnection success rate.

According to a third aspect, this application provides an earbud, where the earbud is a first earbud, and the first earbud includes a processor, a memory, and a Bluetooth chip. The memory is coupled to the processor. The processor is configured to: when a charging case is closed, indicate the Bluetooth chip to break a Bluetooth connection, where the Bluetooth chip stores a Bluetooth address of a terminal and a Bluetooth address of a second earbud. The processor is further configured to: when the charging case is opened, the charging case accommodates only the first earbud, and a first preset condition is met, indicate the Bluetooth chip to send a first paging request to the second earbud based on the Bluetooth address of the second earbud. The first preset condition is that the Bluetooth connection includes a Bluetooth connection between the first earbud and the second earbud.

In an embodiment, when the charging case accommodating only the first earbud is opened, the first earbud may determine whether the first earbud establishes a Bluetooth connection to only the second earbud or establishes Bluetooth connections to both the second earbud and the terminal when the first earbud is placed into the charging case and the charging case is closed. If the first earbud establishes the Bluetooth connection to only the second earbud or establishes the Bluetooth connections to both the second earbud and the terminal when the charging case is closed, the first earbud preferentially reconnects to the second earbud. If the first earbud does not establish the Bluetooth connection to the second earbud when the charging case is closed, the first earbud preferentially reconnects to the terminal. In this way, reconnection duration can be reduced, and user experience is improved.

In an embodiment, the processor is further configured to: when the charging case is opened, the charging case accommodates only the first earbud, and the first preset condition is not met, indicate the Bluetooth chip to send a second paging request to the terminal based on the Bluetooth address of the terminal. In this way, reconnection duration of the first earbud when the charging case accommodating a single earbud is opened can be reduced.

In an embodiment, the processor is further configured to: when the charging case is opened, the charging case accommodates the first earbud, and the first earbud is in a monaural working mode, indicate the Bluetooth chip to send a second paging request to the terminal based on the Bluetooth address of the terminal. In this way, when the first earbud is in the monaural working mode, the first earbud may preferentially reconnect to the terminal when the charging case accommodating a single earbud is opened, to reduce reconnection duration of the first earbud when the charging case accommodating the single earbud is opened.

In an embodiment, the processor is further configured to: when the charging case is opened and the charging case accommodates the first earbud and the second earbud, indicate the Bluetooth chip to send the first paging request to the second earbud based on the Bluetooth address of the second earbud. In this way, when the charging case accommodating two earbuds is opened, the first earbud may preferentially reconnect to the second earbud, to reduce reconnection duration of the first earbud.

In an embodiment, the processor is further configured to: when the charging case is opened and the charging case accommodates the first earbud and a third earbud, indicate the Bluetooth chip to send a second paging request to the terminal based on the Bluetooth address of the terminal, where the first earbud is not paired with the third earbud. In this way, reconnection duration of the first earbud can be reduced.

In an embodiment, the Bluetooth chip is further configured to: after sending the first paging request to the second earbud based on the Bluetooth address of the second earbud, when the Bluetooth chip does not receive, within first preset time, a first paging response sent by the second earbud, send a second paging request to the terminal based on the Bluetooth address of the terminal. In this way, the first earbud may reconnect to the terminal when reconnecting to the second earbud expires, to improve a reconnection success rate.

In an embodiment, the Bluetooth chip is further configured to: after sending the second paging request to the terminal based on the Bluetooth address of the terminal, when the Bluetooth chip does not receive, within second preset time, a second paging response sent by the terminal, send the first paging request to the second earbud based on the Bluetooth address of the second earbud. In this way, the first earbud may reconnect to the second earbud when reconnecting to the terminal expires, to improve a reconnection success rate.

According to a fourth aspect, this application provides a chip system, set in a first earbud. The chip system includes a processor and a Bluetooth chip. The processor is configured to: when a charging case is closed, indicate the Bluetooth chip to break a Bluetooth connection, where the Bluetooth chip stores a Bluetooth address of a terminal and a Bluetooth address of a second earbud. The processor is further configured to: when the charging case is opened, the charging case accommodates only the first earbud, and a first preset condition is met, indicate the Bluetooth chip to send a first paging request to the second earbud based on the Bluetooth address of the second earbud, where the first preset condition is that the Bluetooth connection includes a Bluetooth connection between the first earbud and the second earbud.

In an embodiment, when the charging case accommodating only the first earbud is opened, the first earbud may determine whether the first earbud establishes a Bluetooth connection to only the second earbud or establishes Bluetooth connections to both the second earbud and the terminal when the first earbud is placed into the charging case and the charging case is closed. If the first earbud establishes the Bluetooth connection to only the second earbud or establishes the Bluetooth connections to both the second earbud and the terminal when the charging case is closed, the first earbud preferentially reconnects to the second earbud. If the first earbud does not establish the Bluetooth connection to the second earbud when the charging case is closed, the first earbud preferentially reconnects to the terminal. In this way, reconnection duration can be reduced, and user experience is improved.

In an embodiment, the processor is further configured to: when the charging case is opened, the charging case accommodates only the first earbud, and the first preset condition is not met, indicate the Bluetooth chip to send a second paging request to the terminal based on the Bluetooth address of the terminal. In this way, reconnection duration can be reduced, and user experience is improved.

In an embodiment, the processor is further configured to: when the charging case is opened, the charging case accommodates the first earbud, and the first earbud is in a monaural working mode, indicate the Bluetooth chip to send a second paging request to the terminal based on the Bluetooth address of the terminal. In this way, when the first earbud is in the monaural working mode, the first earbud may preferentially reconnect to the terminal when the charging case accommodating a single earbud is opened, to reduce reconnection duration of the first earbud when the charging case accommodating the single earbud is opened.

In an embodiment, the processor is further configured to: when the charging case is opened and the charging case accommodates the first earbud and the second earbud, indicate the Bluetooth chip to send the first paging request to the second earbud based on the Bluetooth address of the second earbud. In this way, when the charging case accommodating two earbuds is opened, the first earbud may preferentially reconnect to the second earbud, to reduce reconnection duration of the first earbud.

In an embodiment, the processor is further configured to: when the charging case is opened and the charging case accommodates the first earbud and a third earbud, indicate the Bluetooth chip to send a second paging request to the terminal based on the Bluetooth address of the terminal. The first earbud is not paired with the third earbud. In this way, reconnection duration of the first earbud can be reduced.

In an embodiment, the Bluetooth chip is further configured to: after sending the first paging request to the second earbud based on the Bluetooth address of the second earbud, when the Bluetooth chip does not receive, within first preset time, a first paging response sent by the second earbud, send a second paging request to the terminal based on the Bluetooth address of the terminal. In this way, the first earbud may reconnect to the terminal when reconnecting to the second earbud expires, to improve a reconnection success rate.

In an embodiment, the Bluetooth chip is further configured to: after sending the second paging request to the terminal based on the Bluetooth address of the terminal, when the Bluetooth chip does not receive, within second preset time, a second paging response sent by the terminal, send the first paging request to the second earbud based on the Bluetooth address of the second earbud. In this way, the first earbud may reconnect to the second earbud when reconnecting to the terminal expires, to improve a reconnection success rate.

According to a fifth aspect, this application provides a terminal, including one or more processors and one or more memories. The one or more memories are coupled to the one or more processors. The one or more memories are configured to store computer program code. The computer program code includes computer instructions. When the one or more processors execute the computer instructions, a communications apparatus is enabled to perform the communication reconnection method according to any possible implementation of the any aspect.

According to a sixth aspect, this application provides an earbud, where the earbud is a second earbud and includes one or more processors and one or more memories. The one or more memories are coupled to the one or more processors. The one or more memories are configured to store computer program code, where the computer program code includes computer instructions. When the one or more processors execute the computer instructions, the second earbud is enabled to perform the communication reconnection method in any possible implementation of any one of the foregoing aspects.

According to a seventh aspect, an embodiment of this application provides a computer storage medium, including computer instructions. When the computer instructions are run on a terminal, the terminal is enabled to perform the communication reconnection method in any possible implementation of any one of the foregoing aspects.

According to an eighth aspect, an embodiment of this application provides a computer storage medium, including computer instructions. When the computer instructions are run on a second earbud, the second earbud is enabled to perform the communication reconnection method in any possible implementation of any one of the foregoing aspects.

According to a ninth aspect, an embodiment of this application provides a computer program product. When the computer program product runs on a terminal, the terminal is enabled to perform the communication reconnection method in any possible implementation of any one of the foregoing aspects.

According to a tenth aspect, an embodiment of this application provides a computer program product. When the computer program product runs on a second earbud, the second earbud is enabled to perform the communication reconnection method in any possible implementation of any one of the foregoing aspects.

DESCRIPTION OF EMBODIMENTS

The following clearly describes the technical solutions in embodiments of this application in detail with reference to the accompanying drawings. In descriptions of embodiments of this application, unless otherwise stated, "I" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The terms "first" and "second" mentioned below are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

The following describes a system architecture provided in an embodiment of this application.

Figure 1:
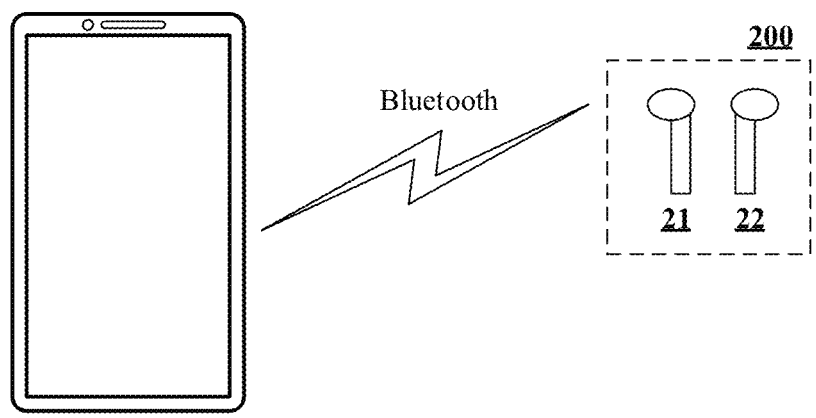
FIG. 1 is a schematic diagram of an architecture of a system according to an embodiment of this application.

FIG. 1 is a schematic diagram of an architecture of a system 10 according to an embodiment of this application. As shown in FIG. 1, the system 10 may include a terminal 100 and a Bluetooth device 200.

The terminal 100 may communicate with the Bluetooth device 200 by using a Bluetooth technology (including basic rate (BR)/enhanced data rate (EDR) Bluetooth and Bluetooth low energy (BLE)). The terminal 100 may be a device such as a smartphone, a media player (for example, an MP3 or an MP4), a tablet computer, a personal digital assistant (PDA), a television, or a smart watch.

In this embodiment of this application, the Bluetooth device 200 may be a true wireless stereo (TWS) headset. The Bluetooth device 200 includes two earbuds (also referred to as earbuds) respectively worn on a left ear and a right ear of a user. The two earbuds may be placed into a charging case for charging. When the Bluetooth device 200 is no longer used, the Bluetooth device 200 may be placed into the charging case for charging. The charging case may communicate with the Bluetooth device 200, to implement operations such as forced pairing, power-on/off of the Bluetooth device 200. A charging interface and a communications interface between the Bluetooth device 200 and the charging case may exist independently or may be combined together.

Figure 2A:
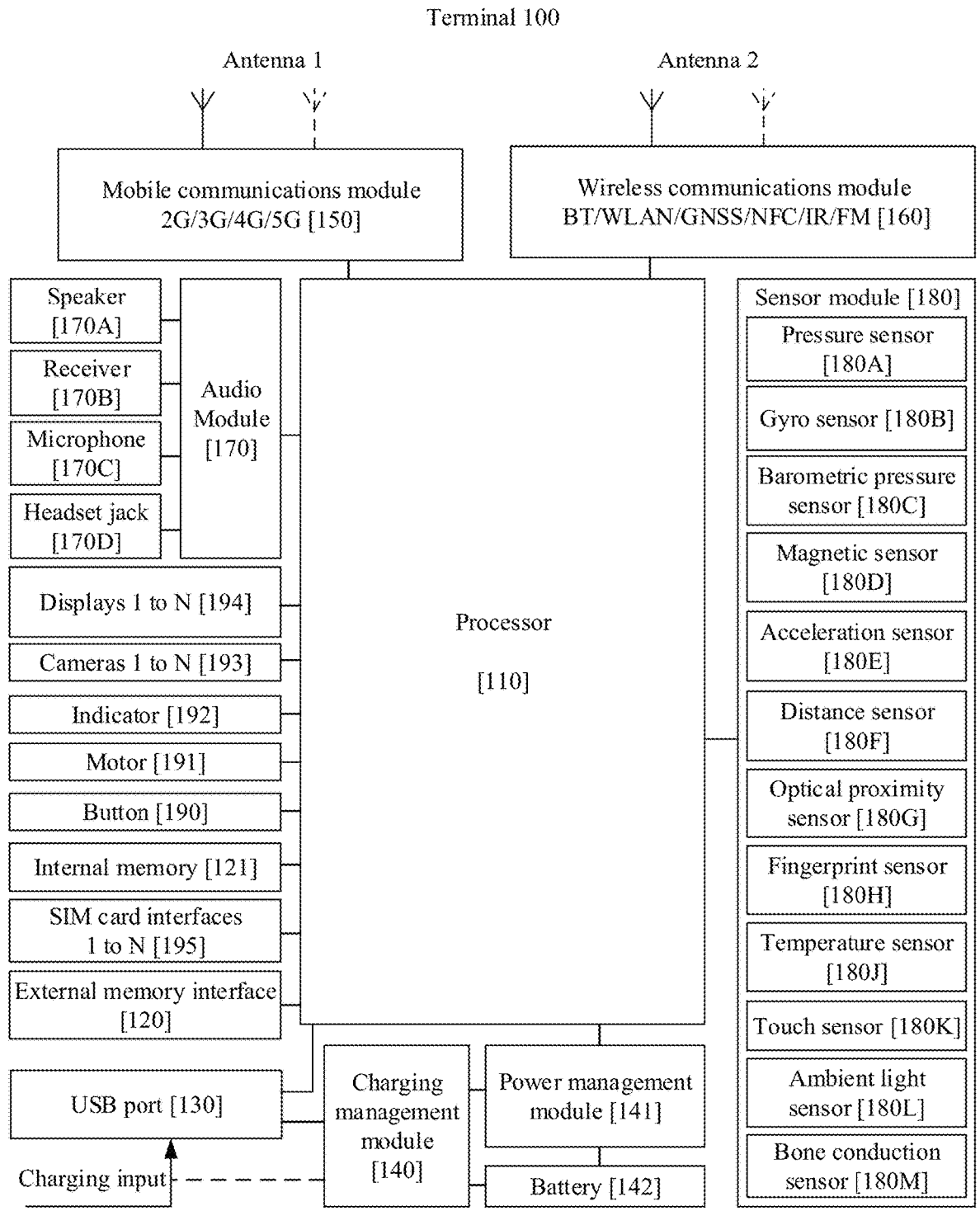
FIG. 2A is a schematic diagram of a structure of a terminal according to an embodiment of this application.

FIG. 2A is a schematic diagram of a structure of a terminal 100. The terminal 100 is used as an example below to describe embodiments in detail. It should be understood that the terminal 100 shown in FIG. 2A is merely an example, and the terminal 100 may have more or fewer components than those shown in FIG. 2A, may combine two or more components, or may have different component configurations. Various components shown in the figure may be implemented in hardware that includes one or more signal processing and/or application-specific integrated circuits, software, or a combination of hardware and software.

The terminal 100 may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the terminal 100. In some other embodiments of this application, the terminal 100 may include more or fewer components than those shown in the figure, or combine some components, or split some components, or have different component arrangements. The components shown in the figure may be implemented by hardware, software, or a combination of the software and the hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent devices, or may be integrated into one or more processors.

The controller may be a nerve center and a command center of the terminal 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, to improve system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) interface, and/or the like.

The I2C interface is a two-way synchronous serial bus, including a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call through a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may alternatively transfer an audio signal to the wireless communications module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the terminal 100. The processor 110 communicates with the display 194 through the DSI interface, to implement a display function of the terminal 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB port 130 is a port that conforms to USB standard specifications, and may be a mini USB port, a micro USB port, a USB Type-C port, or the like. The USB port 130 may be configured to connect to a charger to charge the terminal 100, may be configured to transmit data between the terminal 100 and a peripheral device, or may be configured to connect to a headset, to play audio through a headset. The port may be further configured to connect to another terminal such as an AR device.

It may be understood that an interface connection relationship between the modules that is shown in this embodiment of the present invention is merely an example for description, and does not constitute a limitation on the structure of the terminal 100. In some other embodiments of this application, the terminal 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB port 130. In some embodiments of wireless charging, the charging management module 140 may receive a wireless charging input by using a wireless charging coil of the terminal 100. When charging the battery 142, the charging management module 140 may further supply power to the terminal by using the power management module 141.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal 100 may be implemented by using the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the terminal 100 may be configured to cover one or more communications frequency bands. Different antennas may further be multiplexed, to improve antenna utilization. For example, the antenna 1 may be multiplexed as a diversity antenna in a wireless local area network. In some other embodiments, an antenna may be used in combination with a tuning switch.

The mobile communications module 150 can provide a wireless communications solution that is applied to the terminal 100 and that includes 2G/3G/4G/5G or the like. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert an amplified signal into an electromagnetic wave for radiation through the antenna 1. In some embodiments, at least some functional modules of the mobile communications module 150 may be disposed in the processor 110. In some embodiments, at least some functional modules of the mobile communications module 150 and at least some modules of the processor 110 may be disposed in a same device.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communications module 150 or another functional module.

The wireless communications module 160 may provide a wireless communications solution that is applied to the terminal 100 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communications module 160 may be one or more components integrating at least one communication processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, in the terminal 100, the antenna 1 is coupled to the mobile communications module 150, and the antenna 2 is coupled to the wireless communications module 160, so that the terminal 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-CDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system BDS), a quasi-zenith satellite system (QZSS), and/or a satellite based augmentation system (SBAS).

The terminal 100 implements a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the terminal 100 may include one or N displays 194, where N is a positive integer greater than 1.

The terminal 100 can implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

The digital signal processor is configured to process a digital signal, and may further process another digital signal in addition to the digital image signal. For example, when the terminal 100 selects a frequency, the digital signal processor is configured to perform Fourier transform, and the like on frequency energy.

The video codec is configured to: compress or decompress a digital video. The terminal 100 may support one or more video codecs. In this way, the terminal 100 can play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a transfer mode between human brain neurons, and may further continuously perform self-learning. Applications such as intelligent cognition of the terminal 100 may be implemented by using the NPU, for example, image recognition, facial recognition, speech recognition, and text understanding.

The external memory interface 120 may be configured to be connected to an external storage card such as a micro SD card, to extend a storage capability of the terminal 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to implement various function applications and data processing of the terminal 100. The internal memory 121 may include a program storage area and a data storage area. The program storage area may store an operating system, an application required by at least one function (for example, a sound playing function or an image playing function), and the like. The data storage area may store data (for example, audio data and an address book) created during use of the terminal 100, and the like. In addition, the internal memory 121 may include a high-speed random access memory, and may further include a nonvolatile memory, for example, at least one magnetic disk storage device, a flash memory device, or a universal flash storage (universal flash storage, UFS).

The terminal 100 may implement audio functions such as music playing and recording through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some functional modules of the audio module 170 are disposed in the processor 110.

The speaker 170A, also referred to as a "horn", is configured to convert an audio electrical signal into a sound signal. The terminal 100 may listen to music by using the speaker 170A, or listen to a hands-free call.

The receiver 170B, also referred to as an "earpiece", is configured to convert an audio electrical signal into a sound signal. When a call is answered or audio information is listened to by using the terminal 100, the receiver 170B may be put close to a human ear to listen to a voice.

The microphone 170C, also referred to as a "mike" or a "mic", is configured to convert a sound signal into an electrical signal. When making a call or sending voice information, the user may make a sound near the microphone 170C through the mouth, to enter a sound signal to the microphone 170C. At least one microphone 170C may be disposed in the terminal 100. In some other embodiments, two microphones 170C may be disposed in the terminal 100, to collect a sound signal and further implement a noise reduction function. In some other embodiments, three, four, or more microphones 170C may alternatively be disposed in the terminal 100, to collect a sound signal, reduce noise, further identify a sound source, implement a directional recording function, and the like.

The headset jack 170D is configured to connect to a wired headset. The headset jack 170D may be a USB port 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal 100 determines pressure intensity based on a capacitance change. When a touch operation is performed on the display 194, the terminal 100 detects intensity of the touch operation by using the pressure sensor 180A. The terminal 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to a first pressure threshold is performed on a Messages icon, an instruction for creating a new SMS message is executed.

The gyro sensor 180B may be configured to determine a moving posture of the terminal 100. In some embodiments, angular velocities of the terminal 100 around three axes (namely, x, y, and z axes) may be determined by using the gyro sensor 180B. The gyro sensor 180B may be configured to perform image stabilization during photographing. For example, when the shutter is pressed, the gyro sensor 180B detects an angle at which the terminal 100 jitters, calculates, based on the angle, a distance for which a lens module needs to compensate, and allows the lens to cancel the jitter of the terminal 100 through reverse motion, to implement image stabilization. The gyro sensor 180B may be further used in a navigation scenario and a motion-sensing game scenario.

The barometric pressure sensor 180C is configured to measure barometric pressure. In some embodiments, the terminal 100 calculates an altitude by using a value of the barometric pressure measured by the barometric pressure sensor 180C, to assist in positioning and navigation.

The magnetic sensor 180D includes a Hall effect sensor. The terminal 100 may detect opening and closing of a flip cover by using the magnetic sensor 180D. In some embodiments, when the terminal 100 is a clamshell phone, the terminal 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect magnitudes of accelerations in various directions (usually on three axes) of the terminal 100. When the terminal 100 is still, a magnitude and a direction of gravity may be detected. The acceleration sensor 180E may be further configured to identify a terminal posture, and is applied to an application such as switching between landscape mode and portrait mode or a pedometer.

The distance sensor 180F is configured to measure a distance. The terminal 100 may measure a distance through infrared light or a laser. In some embodiments, in a photographing scenario, the terminal 100 may use the distance sensor 180F to measure a distance, to implement fast focusing.

The optical proximity sensor 180G may include, for example, a light-emitting diode (LED) and an optical detector such as a photodiode. The light-emitting diode may be an infrared light-emitting diode. The terminal 100 emits infrared light by using the light-emitting diode. The terminal 100 detects infrared reflected light from a nearby object by using the photodiode. When sufficient reflected light is detected, it may be determined that there is an object near the terminal 100. When insufficient reflected light is detected, the terminal 100 may determine that there is no object near the terminal 100. The terminal 100 may detect, by using the optical proximity sensor 180G, that the terminal 100 held by the user is close to an ear for a call, to automatically turn off a screen to save power. The optical proximity sensor 180G may also be used in a smart cover mode or a pocket mode to automatically perform screen unlocking or locking.

The ambient light sensor 180L is configured to sense ambient light brightness. The terminal 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the terminal 100 is in a pocket to prevent a false touch.

The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal 100 executes a temperature processing policy by using the temperature detected by the temperature sensor 180J. For example, when the temperature reported by the temperature sensor 180J exceeds a threshold, the terminal 100 lowers performance of a processor located near the temperature sensor 180J, to reduce power consumption to implement thermal protection. In some other embodiments, when the temperature is less than another threshold, the terminal 100 heats the battery 142 to prevent the terminal 100 from being shut down abnormally because of a low temperature. In some other embodiments, when the temperature is less than still another threshold, the terminal 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen. The touch sensor 180K is configured to detect a touch operation performed on or near the touch sensor 180K. The touch sensor may transfer the detected touch operation to the application processor, to determine a type of a touch event. A visual output related to the touch operation may be provided through the display 194. In some other embodiments, the touch sensor 180K may also be disposed on a surface of the terminal 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in the headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal 100 may receive a key input, and generate a key signal input related to a user setting and function control of the terminal 100.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm, a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or plugged from the SIM card interface 195, to implement contact with or separation from the terminal 100. The terminal 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may be further compatible with an external storage card. The terminal 100 interacts with a network through a SIM card, to implement functions such as calling and data communication. In some embodiments, the terminal 100 uses an eSIM, that is, an embedded SIM card. The eSIM card may be embedded into the terminal 100, and cannot be separated from the terminal 100.

Figure 2B:
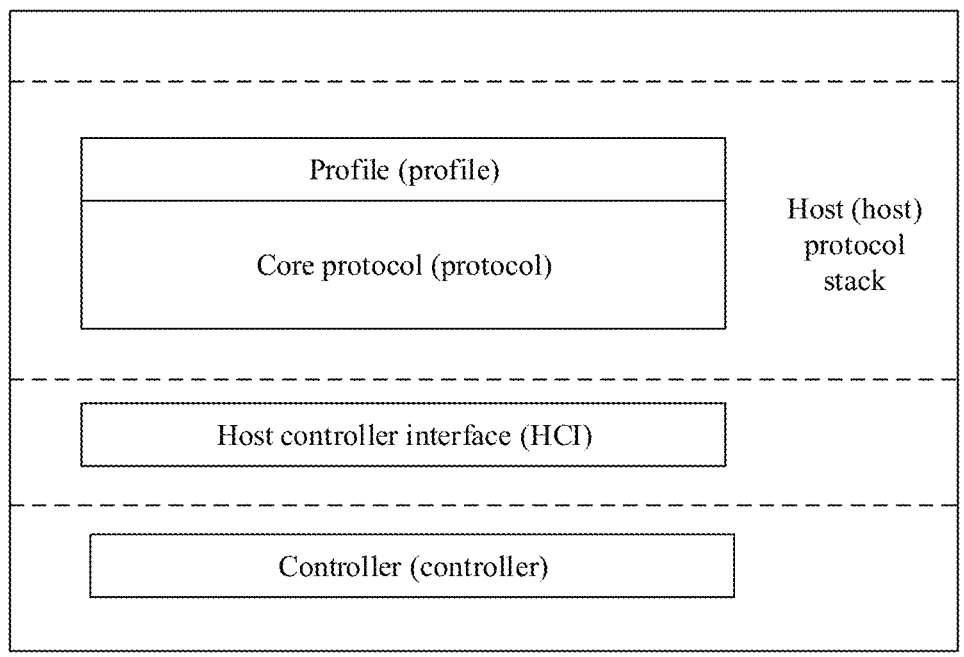
FIG. 2B is a schematic diagram of an architecture of a Bluetooth protocol according to an embodiment of this application.

As shown in FIG. 2B, an embodiment of this application provides a Bluetooth protocol framework, including but not limited to a host protocol stack, a host controller interface (HCI), and a controller.

The host protocol stack defines a plurality of profiles (profiles) and core protocols (protocols) in a Bluetooth framework, each profile defines a corresponding message format and application rule, and the profile is a Bluetooth service. To implement interconnection and interworking between different devices on different platforms, a Bluetooth protocol has formulated specifications for various possible and universal application scenarios, for example, an advanced audio distribution profile (A2DP) and a hands-free profile (hands-free profile, HFP).

The core protocols include but are not limited to a basic Bluetooth service discover protocol (SDP), a logical link control and adaptation protocol (L2CAP), and the like. The core protocol is essential to a Bluetooth protocol stack.

The HCI provides a unified interface for an upper layer protocol to enter a link manager and a unified manner for entering a baseband. There are several transport layers between a host core protocol stack and the controller, and these transport layers are transparent to complete a task of transmitting data. The Bluetooth Special Interest Group (SIG) specifies four physical bus manners to connect to hardware, namely, four HCI transport layers: the USB, the RS232, the UART, and the PC card.

The controller defines a bottom-layer hardware part, including a radio frequency (RF), a baseband (BB), and a link manager (LM). An RF layer filters and transmits data bit streams by using microwaves on a 2.4 GHz unlicensed ISM band, and mainly defines conditions that a Bluetooth transceiver needs to meet to work properly on this frequency band. The baseband is responsible for frequency hopping and transmission of Bluetooth data and information frames. The link manager is responsible for connection, establishment, and disconnection of links, and security control. A link manager (LM) layer is a link manager layer protocol of the Bluetooth protocol stack, and is responsible for translating an upper-layer HCI command into an operation acceptable to the baseband, and establishing an asynchronous connection-oriented link (ACL), a synchronous connection-oriented (SCO) link, a working mode that causes the Bluetooth device to enter an energy saving state, and the like. A link control (LC) layer is responsible for responding to upper-layer LM commands during transmission of a batch of data packets (for example, executing LM commands for functions such as establishing a data packet transmission link and maintaining a link).

Some content of the method described in embodiments of this application is implemented by the wireless communications module 160 of the terminal 100 shown in FIG. 2A may be performed by a Bluetooth module or a Bluetooth chip.

Figure 3A:
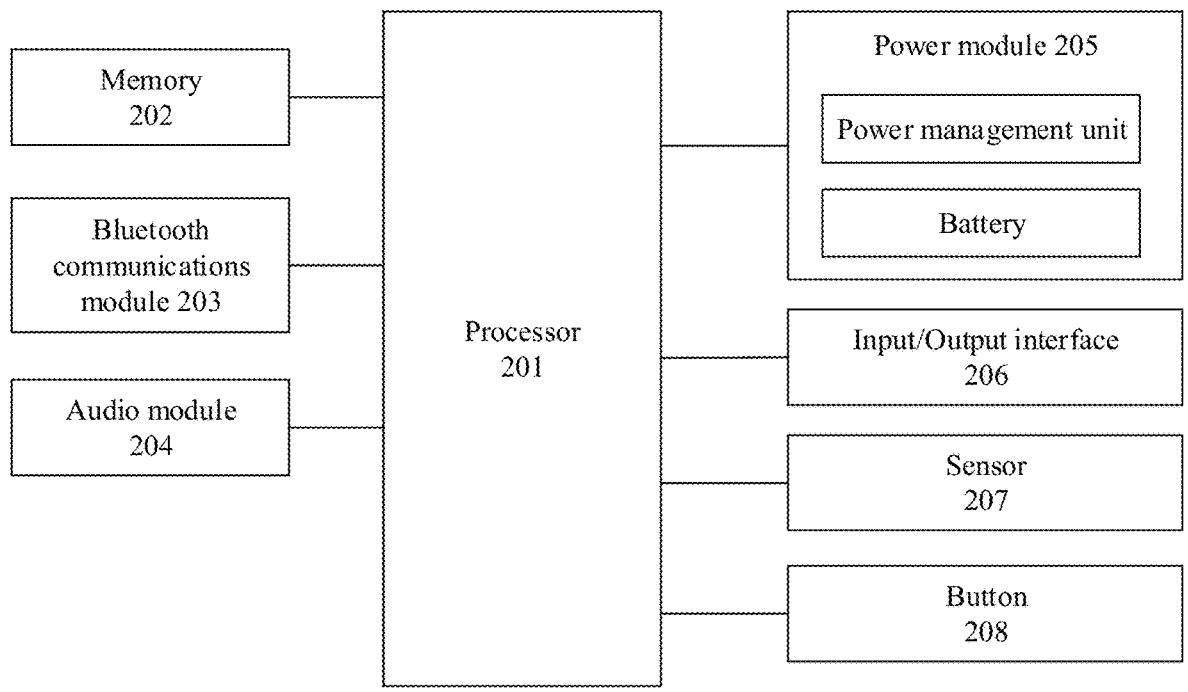
FIG. 3A is a schematic diagram of a structure of a Bluetooth device according to an embodiment of this application.

FIG. 3A is a schematic diagram of an example of a structure of a Bluetooth device 200 according to an embodiment of this application.

It should be understood that the Bluetooth device 200 shown in FIG. 3A is merely an example, and the Bluetooth device 200 may have more or fewer components than those shown in FIG. 3A, may combine two or more components, or may have different component configurations. Various components shown in the figure may be implemented in hardware that includes one or more signal processing and/or application-specific integrated circuits, software, or a combination of hardware and software.

In this embodiment of this application, the Bluetooth device 200 may include a first earbud and a second earbud. For structures of both the first earbud and the second earbud, refer to FIG. 3A.

As shown in FIG. 3A, the Bluetooth device 200 may include a processor 201, a memory 202, a Bluetooth communications module 203, an audio module 204, a power module 205, an input/output interface 206, a sensor 207, and a button 208.

The processor 201 may be configured to read and execute computer-readable instructions. In a specific implementation, the processor 201 may mainly include a controller, an operator, and a register. The controller is mainly responsible for decoding an instruction, and sends a control signal for an operation corresponding to the instruction. The operator is mainly responsible for storing a register operand, an intermediate operation result, and the like that are temporarily stored during instruction execution. In a specific implementation, a hardware architecture of the processor 201 may be an application-specific integrated circuit (ASIC) architecture, an MIPS architecture, an ARM architecture, an NP architecture, or the like.

In some embodiments, the processor 201 may be configured to parse a signal received by the Bluetooth communications processing module 203, for example, a pairing mode modification request sent by a terminal 100. The processor 201 may be configured to perform a corresponding processing operation based on a parsing result, for example, generate a pairing mode modification response, and the like.

The memory 202 is coupled to the processor 201, and is configured to store various software programs and/or a plurality of sets of instructions. In a specific implementation, the memory 202 may include a high-speed random access memory, and may further include a nonvolatile memory, for example, one or more magnetic disk storage devices, a flash memory device, or another nonvolatile solid-state storage device. The memory 202 may store an operating system, for example, an embedded operating system such as uCOS, VxWorks, or RTLinux. The memory 202 may further store a communication program. The communication program may be used to communicate with the terminal 100, one or more servers, or another device.

The Bluetooth communications module 203 may include a Bluetooth chip. The Bluetooth device 200 may perform pairing with a Bluetooth chip of another electronic device by using the Bluetooth chip and establish a Bluetooth connection, to implement wireless communication and service processing between the Bluetooth device 200 and the another device through the Bluetooth connection. Generally, the Bluetooth chip may support BR/EDR Bluetooth and BLE, for example, may receive/send paging (page) information, receive/send a BLE broadcast message, and the like.

In addition, the Bluetooth communications module 203 may further include an antenna. The Bluetooth communications module 203 receives an electromagnetic wave through the antenna, performs frequency modulation and filtering processing on the electromagnetic wave signal, and sends a processed signal to the processor 201. The Bluetooth communications module 203 may further receive a to-be-sent signal from the processor 201, perform frequency modulation and amplification on the signal, and convert the signal into an electromagnetic wave through an antenna for radiation.

The audio module 204 may be configured to: manage audio data, and input and output an audio signal of the Bluetooth device 200. For example, the audio module 204 may obtain an audio signal from the Bluetooth communications module 203, or transmit an audio signal to the Bluetooth communications module 203, to implement functions such as answering a call, playing audio, enabling/disabling a voice assistant of a terminal connected to the earbud, and receiving/sending voice data of a user through the Bluetooth device 200. The audio module 204 may include a speaker (or referred to as an earpiece or a receiver) component configured to output an audio signal, a microphone (or referred to as a mike or a mic), a microphone radio circuit cooperating with the microphone, and the like. The speaker may be configured to: convert an audio electrical signal into a sound signal and play the sound signal. The microphone may be configured to convert a sound signal into an audio electrical signal.

The power module 205 may be configured to: provide system power for the Bluetooth device 200, supply power to each module of the Bluetooth device 200, support the Bluetooth device 200 in receiving a charging input, and the like. The power module 205 may include a power management unit (power management unit, PMU) and a battery. The power management unit may receive an external charging input, provide an electrical signal input by a charging circuit to the battery for charging, and further provide an electrical signal provided by the battery to other modules such as the audio module 204 and the Bluetooth communications module 203, to prevent battery overcharging, over-discharging, short circuit, overcurrent, and the like. In some embodiments, the power module 205 may further include a wireless charging coil for wirelessly charging the Bluetooth device 200. In addition, the power management unit may be further configured to monitor parameters such as a battery capacity, a battery cycle count, and a battery health status (electric leakage or impedance).

A plurality of input/output interfaces 206 may be configured to provide a wired connection for charging or communication between the Bluetooth device 200 and a charging case. In some embodiments, the input/output interface may be a USB port. In some other embodiments, the input/output interface 206 may be an earbud electrical connector. When the Bluetooth device 200 is placed into the charging case, the Bluetooth device 200 may charge a battery in the Bluetooth device 200 through an electrical connection to the charging case implemented in an earbud connector pogo pin manner. In some embodiments, after the electrical connection is established, the Bluetooth device 200 may further perform data communication with the charging case, for example, may receive information such as a pairing instruction, a power-on instruction, and a power-off instruction from the charging case.

In addition, the Bluetooth device 200 may further include a sensor 207. For example, the sensor 207 may be a distance sensor or an optical proximity sensor, and may be configured to determine whether the Bluetooth device 200 is worn by a user. For example, the Bluetooth device 200 may detect, by using the distance sensor, whether an object exists near the Bluetooth device 200, to determine whether the Bluetooth device 200 is worn by the user. When determining that the Bluetooth device 200 is worn, the Bluetooth device 200 may turn on a speaker.

For another example, the sensor 207 may further include a bone conduction sensor, to form a bone conduction headset. The Bluetooth device 200 may obtain a vibration signal of a vibration bone of a human vocal-cord part by using the bone conduction sensor, and obtain a voice signal through parsing, to implement a voice function, thereby receiving voice instructions of the user. The Bluetooth device 200 may further perform voice authentication based on the user voice signal obtained by the bone conduction headset, to authenticate a user identity in a service scenario such as a payment transaction.

For another example, the sensor 207 may further include: a touch sensor, configured to detect a touch operation of a user; a fingerprint sensor, configured to detect a user fingerprint, identify a user identity, and the like; an ambient light sensor, configured to adaptively adjust some parameters (such as volume) based on sensed luminance of ambient light; and some other sensors.

In some embodiments, the touch sensor may detect a touch operation of the user such as single-tap, double-tap, multi-tap, touch and hold, and heavy press, and may further perform fingerprint recognition for the user, to attempt to authenticate a user identity in a service scenario such as a payment transaction scenario.

It may be understood that, the structure illustrated in this embodiment of this application does not constitute a specific limitation on the Bluetooth device 200, and the Bluetooth device 200 may have more or fewer components than those shown in FIG. 3A, may combine two or more components, or may have different component configurations. For example, an outer surface of the Bluetooth device 200 may further include components such as a button 208, an indicator light (which may indicate a battery level, an incoming call/outgoing call, and a pairing mode), and a display (which may prompt the user with related information). The button 208 may be a physical button, a touch button (used in cooperation with the touch sensor), or the like, and is configured to trigger operations such as power-on, power-off, pause, play, record, start pairing, and reset.

For example, when the Bluetooth device 200 is a TWS headset, the Bluetooth device 200 may include an earbud (also referred to as a left earbud) worn on the left ear and an earbud (also referred to as a right earbud) worn on the right ear. The headset may include a housing and an inner part. The inner part is disposed in a cavity formed by the housing. The inner part may include components in modules such as the audio module, the power module, and the Bluetooth communications module shown in FIG. 3A.

When the Bluetooth device 200 is the TWS headset, the user may use the TWS headset in a binaural mode or a monaural mode. In the monaural mode, the user may wear only the left earbud or the right earbud to perform audio services such as music listening or call receiving/making. In the binaural mode, the user may wear the two earbuds to listen to music or perform another audio service. In the binaural mode, the two earbuds include a primary earbud and a secondary earbud. In addition, in a process of using the TWS headset, the primary and secondary roles of the two earbuds may be switched.

In some embodiments, the TWS headset may exchange control information, for example, connection control information or service control information, with the terminal 100 through the primary earbud. Therefore, a Bluetooth connection to the terminal 100 may be established or broken based on the connection control information, and an operation such as service action control (for example, pause, play, and last song) is performed based on the service control information.

In one case, a Bluetooth connection is established between the primary earbud and the terminal 100, and Bluetooth communication may be performed between the primary earbud and the terminal 100 to exchange control information and audio data. A Bluetooth connection is also established between the primary earbud and the secondary earbud, and the primary earbud may notify the secondary earbud to perform status synchronization, for example, establish/break a physical connection or a virtual connection to the terminal 100. The secondary earbud may receive, in a manner such as forwarding of the primary earbud and listening, audio data sent by the terminal 100.

In a listening mode, the Bluetooth connection is established between the terminal 100 and the primary earbud, to complete sending of audio data to the primary earbud and complete a service action triggered by the terminal 100 and the TWS headset (for example, play, pause, switch to last song, turn up the volume). The Bluetooth connection is established between the two earbuds to complete information synchronization between the two earbuds. The secondary earbud obtains audio data by listening to a Bluetooth link between the primary earbud and the terminal 100.

In a forwarding mode, the Bluetooth connection is established between the terminal 100 and the primary earbud to complete sending of audio data to the primary earbud and complete a service action triggered by the terminal 100 and the TWS headset. The Bluetooth connection is established between the two earbuds to complete information synchronization between the two earbuds, and the primary earbud forwards audio data to the secondary earbud through a Bluetooth link between the primary earbud and the secondary earbud.

Figure 3B:
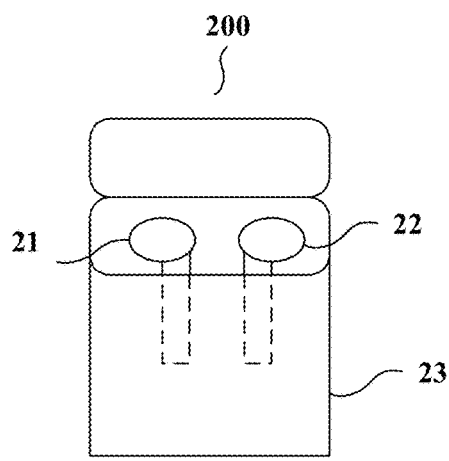
FIG. 3B is a schematic diagram of a structure of a charging case of a Bluetooth device according to an embodiment of this application.

FIG. 3B is further a schematic diagram of a charging case 23 used to accommodate a Bluetooth device 200. In some embodiments, the charging case may include one or more magnets inside, to attract earbuds into a cavity in the charging case. The charging case may include a battery and a plurality of input/output interfaces. After an electrical connection is separately established to earbud electrical connectors in the two earbuds (an earbud 21 and an earbud 22), the charging case 23 may charge a battery in the earbud by using a battery of the charging case 23.

For a structure of the earbud 21 or the earbud 22 of the Bluetooth device 200, refer to the schematic diagram of the structure shown in FIG. 3A.

In some embodiments, at least one touch control may be disposed on the charging case, and may be configured to trigger a function such as pairing reset of the Bluetooth device 200 or charging a wireless earbud. The charging case may be further provided with one or more battery level indicators, to prompt the user with a battery level of the battery in the charging case and a battery level of a battery of each earbud in the charging case.

In some embodiments, the charging case may further include components such as a processor and a memory. The memory may be configured to store application code, and the processor of the charging case controls the application code to be executed, to implement functions of the charging case. For example, the processor of the charging case executes the application program code stored in the memory to charge the Bluetooth device 200 when detecting that the Bluetooth device 200 is placed into the charging case.

In addition, a charging interface may be further disposed on the charging case, to charge the battery of the charging case. The charging case may further include a wireless charging coil, configured to wirelessly charge the battery of the charging case. It may be understood that the charging case may further include other components. Details are not described herein.

In a related technology, an example in which the Bluetooth device 200 is a TWS headset is used, and the Bluetooth device 200 has two earbuds (including a first earbud and a second earbud). When the Bluetooth device 200 works, the two earbuds may be classified into a primary earbud and a secondary earbud. A Bluetooth connection may be established between the primary earbud and the secondary earbud, and the primary earbud may establish a Bluetooth connection to a terminal 100. The primary earbud may send connection information such as a Bluetooth address and a link key of the terminal 100 to the secondary earbud. In this way, the secondary earbud may also receive, by using the connection information sent by the primary earbud, data sent by the terminal 100 to the primary earbud. In addition, in a process of using the Bluetooth device 200, primary and secondary roles of the two earbuds may be switched. When the Bluetooth device 200 is placed into the charging case and the charging case is closed, the Bluetooth connection established between the primary earbud in the Bluetooth device 200 and the terminal 100 is broken, and the Bluetooth connection between the primary earbud and the secondary earbud is also broken.

Figure 4A:
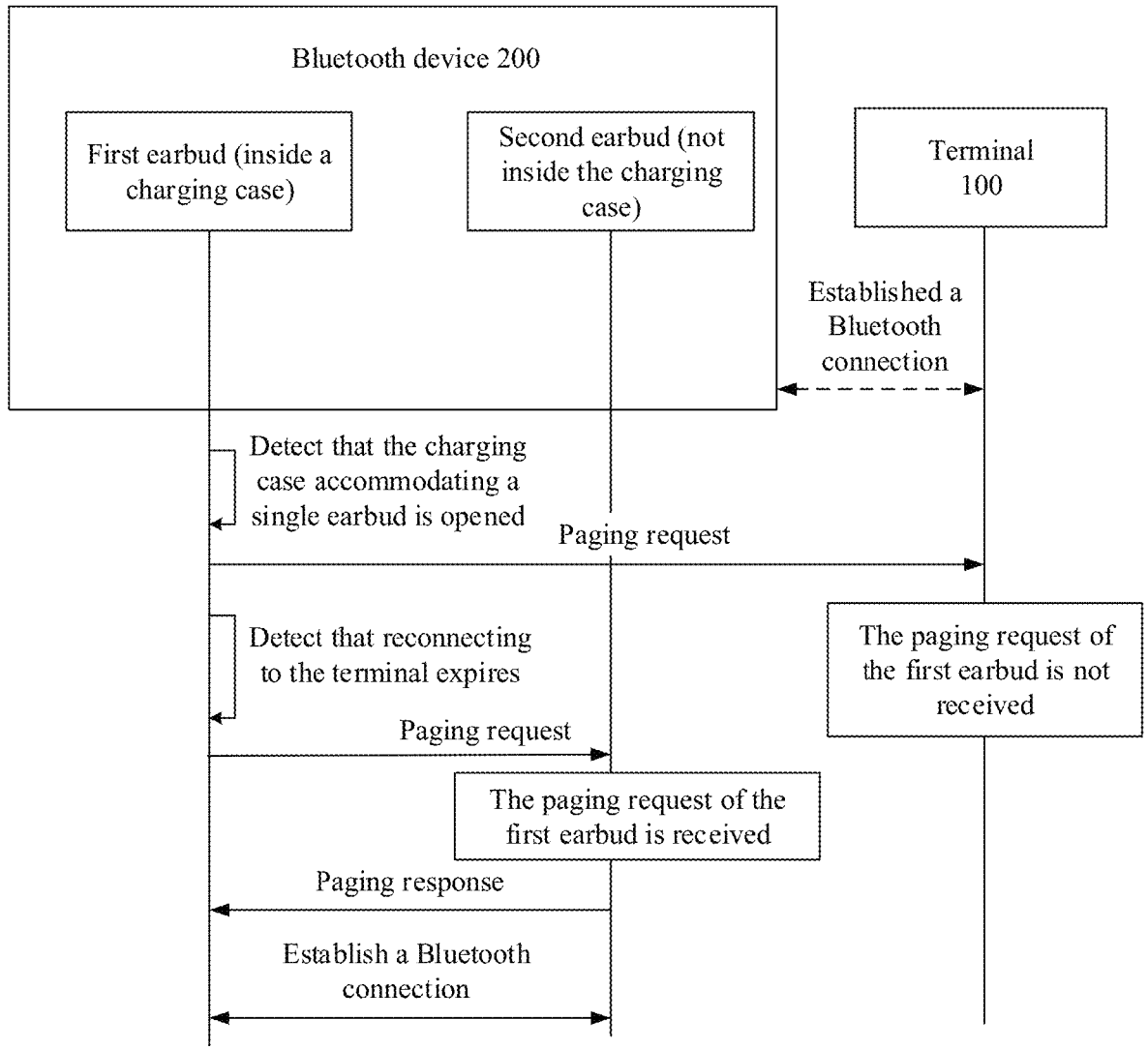
FIG. 4A is a schematic flowchart of Bluetooth reconnection in a related technology of this application.

Currently, there is the following use scenario of a Bluetooth headset: The Bluetooth device 200 established a Bluetooth connection to the terminal 100, and the connection information such as the Bluetooth address and the link key of the terminal 100 is stored on the two earbuds in the Bluetooth device 200. When the Bluetooth device 200 is placed into the charging case, only one earbud (for example, the first earbud) is placed into the charging case. In this use scenario, when the charging case accommodating only the first earbud is opened again, the first earbud can be configured with only a single Bluetooth reconnection policy. The Bluetooth reconnection policy may be as follows:

Reconnection policy 1: As shown in FIG. 4A, when the first earbud detects that the charging case accommodating a single earbud is opened (that is, there is only the first earbud in the charging case), the first earbud may first send a paging request to the terminal 100, to attempt to reconnect to the terminal 100. In this case, if the terminal 100 is not around the first earbud or a Bluetooth function has been disabled and a user has connected the second earbud to another device through Bluetooth, the user needs to use the first earbud as a secondary earbud and connect to the second earbud used as a primary earbud, to receive audio data of the another device by using the first earbud and the second earbud.

However, because the terminal 100 is not around the first earbud or the Bluetooth function has been disabled, the terminal 100 cannot receive the paging request of the first earbud. Consequently, the first earbud cannot reconnect to the terminal 100. The first earbud sends the paging request to the second earbud only after reconnecting to the terminal 100 expires (where for example, the terminal 100 is not reconnected to through Bluetooth for more than 10 s), to attempt to reconnect to the second earbud. After receiving the paging request of the first earbud, the second earbud may return a paging response to the first earbud, and further establish a Bluetooth connection to the first earbud.

According to the foregoing reconnection policy 1, when the charging case accommodating only the first earbud is opened, it takes a long time for the first earbud to reconnect to the second earbud based on a requirement of the user, affecting user experience.

Figure 4B:
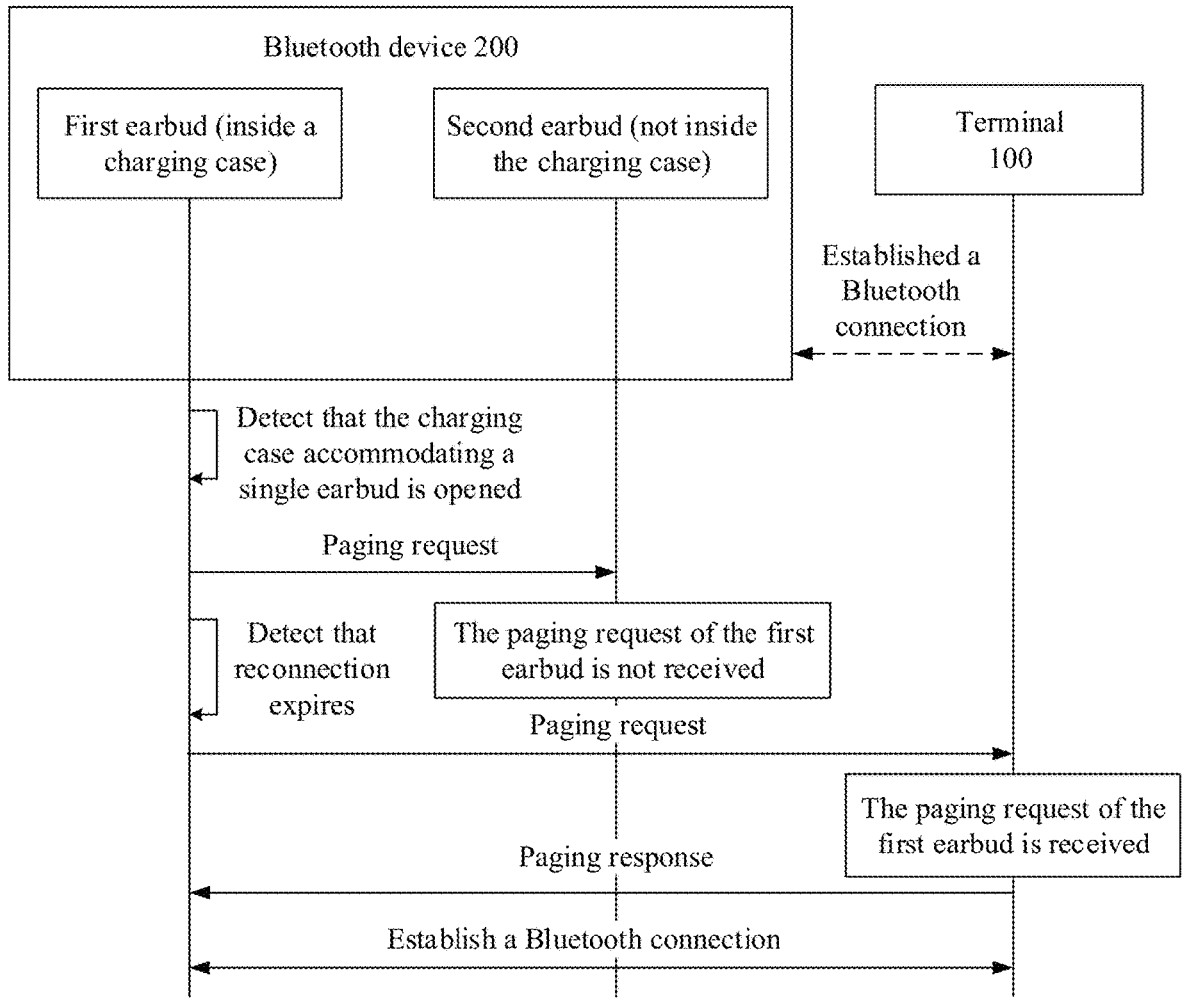
FIG. 4B is a schematic flowchart of Bluetooth reconnection in a related technology of this application.

Reconnection policy 2: As shown in FIG. 4B, when the first earbud detects that the charging case accommodating a single earbud is opened (that is, there is only the first earbud in the charging case), the first earbud may first send a paging request to the second earbud, to attempt to reconnect to the second earbud. If the second earbud is lost and is not around the first earbud, the user can only connect the first earbud to the terminal 100 separately for use.

However, because the second earbud is not around the first earbud or the second earbud is lost, the first earbud cannot reconnect to the second earbud. Therefore, the first earbud needs to send the paging request to the terminal 100 only after reconnecting to the second earbud expires (where for example, the terminal 100 is not reconnected to through Bluetooth for more than 10 s), to attempt to reconnect to the terminal 100. After receiving the paging request of the first earbud, the terminal 100 may return a paging response to the first earbud, and further establish a Bluetooth connection to the first earbud.

According to the foregoing reconnection policy 2, when the charging case accommodating only the first earbud is opened, it takes a long time for the first earbud to reconnect to the terminal 100 based on a requirement of the user, affecting user experience.

Therefore, an embodiment of this application provides a Bluetooth reconnection method. When a charging case accommodating only a first earbud is opened, the first earbud may determine whether a Bluetooth connection is established to a second earbud when the first earbud is placed into the charging case and the charging case is closed. If the Bluetooth connection is established to the second earbud, the first earbud preferentially reconnects to the second earbud when the charging case is opened. If the Bluetooth connection is not established to the second earbud, the first earbud preferentially reconnects to the terminal 100. In this way, reconnection duration can be reduced, and user experience is improved.

The following describes a Bluetooth reconnection method provided in an embodiment of this application.

Figure 5:
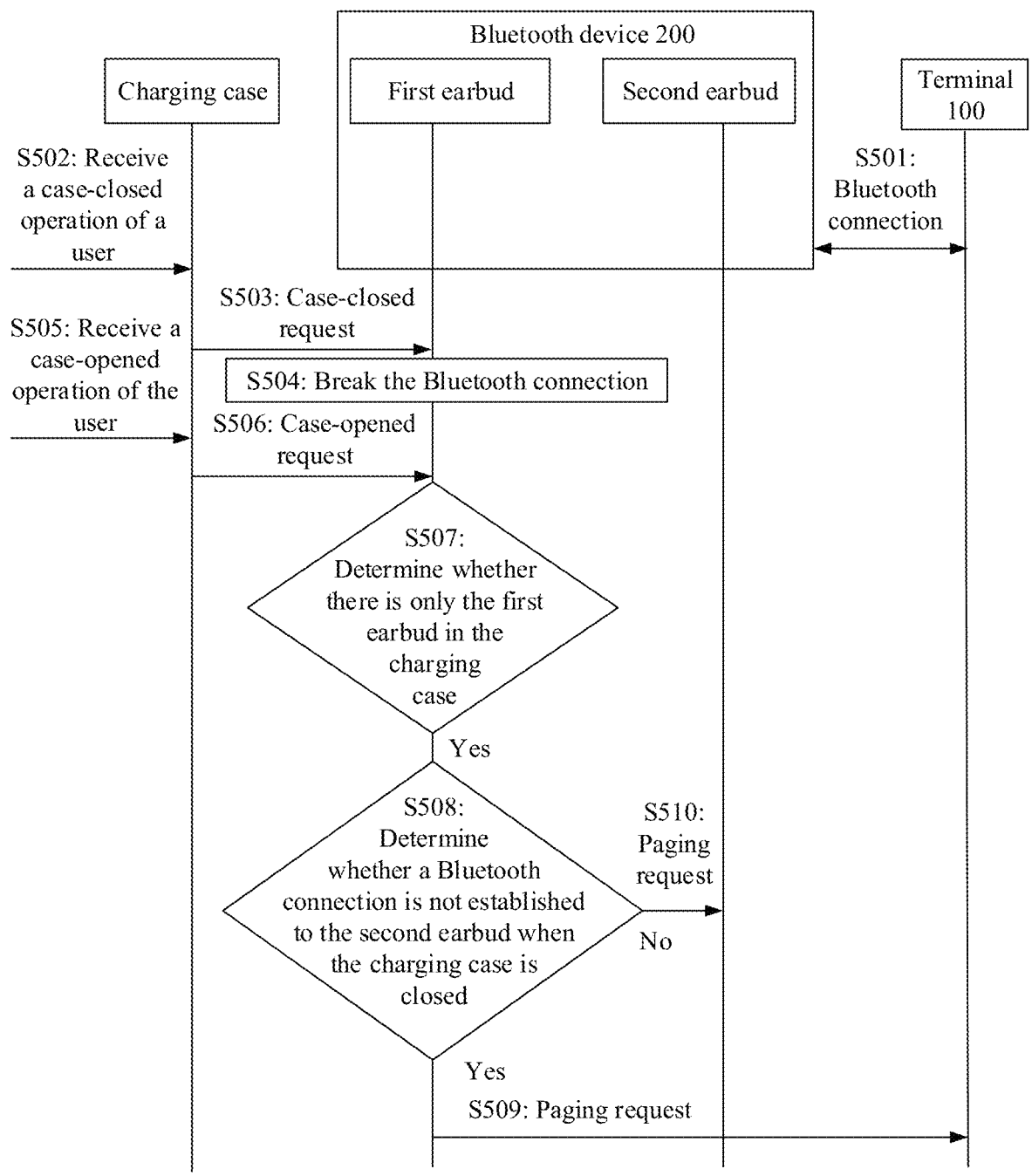
FIG. 5 is a schematic flowchart of a Bluetooth reconnection method according to an embodiment of this application.

FIG. 5 is a schematic flowchart of a Bluetooth reconnection method according to an embodiment of this application. In this embodiment of this application, a Bluetooth device 200 may include a first earbud and a second earbud. As shown in FIG. 5, the method includes the following operations.

S501: A terminal 100 establishes a Bluetooth connection to the Bluetooth device 200.

The Bluetooth device 200 includes the first earbud and the second earbud. The first earbud and the second earbud may play primary and secondary roles.

When the terminal 100 establishes the Bluetooth connection to the Bluetooth device 200, there may be the following two cases.

Case 1. When the first earbud is a primary earbud and the second earbud is a secondary earbud, the first earbud may first establish a Bluetooth connection to the second earbud, and then, the first earbud establishes a Bluetooth connection to the terminal 100. The Bluetooth connection includes a BR/EDR Bluetooth connection. After the first earbud establishes the Bluetooth connection to the terminal 100 and establishes the Bluetooth connection to the second earbud, the first earbud may store a Bluetooth address (BD_ADDR) of the terminal 100, and the first earbud may send the Bluetooth address of the terminal 100 to the second earbud.

Case 2. When the first earbud is a secondary earbud and the second earbud is a primary earbud, the first earbud may first establish a Bluetooth connection to the second earbud, and then, the second earbud establishes a Bluetooth connection to the terminal 100. After the second earbud establishes the Bluetooth connection to the terminal 100, the second earbud may store a Bluetooth address of the terminal 100, and the second earbud may send the Bluetooth address of the terminal 100 to the first earbud.

S502: A charging case receives a case-closed operation of a user.

A physical switch may be disposed on the charging case, and the physical switch may be used to detect whether the charging case is in a closed state. When the user closes the charging case, the physical switch on the charging case is triggered to switch to the closed state. The charging case may detect, through the physical switch, the case-closed operation of the user.

In an embodiment of this application, the charging case may detect the case-closed operation of the user through, but not limited to, the physical switch, and may alternatively detect the case-closed operation of the user through some sensors (such as a magnetic sensor or a proximity sensor). This is not limited herein.

S503: In response to the case-closed operation, the charging case sends a case-closed request to the first earbud.

When the first earbud is placed into the charging case, there is an electrical connection between the first earbud and the charging case. The charging case may send the case-closed request to the first earbud through the electrical connection.

S504: After receiving the case-closed request, the first earbud breaks the Bluetooth connection.

When the first earbud is the primary earbud, and has established the Bluetooth connection to the terminal 100 and has also established the Bluetooth connection to the second earbud, after receiving the case-closed request sent by the charging case, the first earbud may break the Bluetooth connection to the terminal 100 and the Bluetooth connection to the second earbud.

When the first earbud is the secondary earbud, and has established the Bluetooth connection to the second earbud, after receiving the case-closed request sent by the charging case, the first earbud may break the Bluetooth connection to the second earbud.

S505: The charging case receives a case-opened operation of the user.

The physical switch may be disposed on the charging case, and the physical switch may be used to detect whether the charging case is in an opened state. When the user opens the charging case, the physical switch on the charging case is triggered to switch to the opened state. The charging case may detect, through the physical switch, the case-opened operation of the user.

In an embodiment of this application, the charging case may detect the case-opened operation of the user through, but not limited to, the physical switch, and may alternatively detect the case-opened operation of the user through some sensors (such as a magnetic sensor or a proximity sensor). This is not limited herein.

S506: In response to the case-opened operation, the charging case sends a case-opened request to the first earbud.

The case-opened request may include a quantity of earbuds in the charging case.

S507: After receiving the case-opened request, the first earbud determines whether there is only the first earbud in the charging case.

After the first earbud receives the case-opened request sent by the charging case, the first earbud may determine, based on the case-opened request, whether there is only the first earbud in the charging case.

In an embodiment, if there are both the first earbud and the second earbud in the charging case, the first earbud may determine whether the first earbud was paired with the second earbud. If the first earbud was paired with the second earbud, the first earbud and the second earbud preferentially perform Bluetooth reconnection. If the first earbud was not paired with the second earbud, the first earbud sends a paging request to the terminal 100.

There may be the following two implementations in which the first earbud and the second earbud perform Bluetooth reconnection.

Implementation 1: When the first earbud determines that the charging case includes both the first earbud and the second earbud that have been paired, the first earbud may enter a paging state, and the second earbud may enter a paging scan state. After entering the page state, the first earbud may send a paging request to the second earbud. The paging request sent by the first earbud to the second earbud includes a device access code (DAC) of the second earbud.

After the second earbud enters the page scan state, the second earbud may select, based on a paging hopping sequence, a new monitoring frequency to monitor the device access code of the second earbud at a specific time interval (for example, 1.28 s). The paging hopping sequence used by the second earbud is a well-defined periodic sequence, and various frequencies of the paging hopping sequence are evenly distributed on 79 frequency channels of 2.4 G. Duration of scanning performed by the second earbud on a paging frequency channel may be referred to as a paging scan window, and a size of the paging scan window is fixed. An interval between start time points of two consecutive paging scan windows may be referred to as a paging scan interval, and the paging scan interval is fixed. A value range of the paging scan interval may be 11.25 ms to 2560 ms. The second earbud monitors a device access code of the first earbud in a time period in which a scan window exists.

After receiving the paging request of the first earbud, the second earbud may send a paging response to the first earbud in a next slot. After receiving the paging response sent by the second earbud, the first earbud may initiate a connection request to the second earbud, and the first earbud and the second earbud recover the Bluetooth connection. In a connected state, the communication parties: the first earbud and the second earbud hop one frequency channel at a specific time interval (for example, 625 microseconds).

Implementation 2: When the first earbud determines that the charging case includes both the first earbud and the second earbud that have been paired, the first earbud may enter a page scan state, and the second earbud may enter a page state. After entering the page state, the second earbud may send a paging request to the first earbud. The paging request sent by the second earbud to the first earbud includes a device access code of the first earbud.

After the first earbud enters the page scan state, the first earbud may select, based on a paging hopping sequence, a new monitoring frequency to monitor the device access code of the first earbud at a specific time interval (for example, 1.28 s). The paging hopping sequence used by the first earbud is a well-defined periodic sequence, and various frequencies of the paging hopping sequence are evenly distributed on 79 frequency channels of 2.4 G. Duration of scanning performed by the first earbud on a paging frequency channel may be referred to as a paging scan window, and a size of the paging scan window is fixed. An interval between start time points of two consecutive paging scan windows may be referred to as a paging scan interval, and the paging scan interval is fixed. A value range of the paging scan interval may be 11.25 ms to 2560 ms. The first earbud monitors the paging request of the second earbud in a time period in which a scan window exists.

After receiving the paging request of the second earbud, the first earbud may send a paging response to the second earbud in a next slot. After receiving the paging response sent by the first earbud, the second earbud may send a connection request to the first earbud, and the first earbud and the second earbud recover the Bluetooth connection. In a connected state, the communication parties: the first earbud and the second earbud hop one frequency channel at a specific time interval (for example, 625 microseconds).

In some embodiments, after the first earbud and the second earbud perform Bluetooth reconnection, a primary earbud (for example, the first earbud) in the two earbuds may send a paging request to the terminal 100. If the terminal 100 receives the paging request sent by the primary earbud, the terminal 100 may send a paging response to the primary earbud. After receiving the paging response sent by the terminal 100, the primary earbud may send a connection request to the terminal 100. Then, the Bluetooth connection between the primary earbud and the terminal 100 is recovered. In a state in which the primary earbud and the terminal 100 are connected, the primary earbud and the second earbud hop one frequency channel at a specific time interval (for example, 625 microseconds).

S508: If there is only the first earbud in the charging case, the first earbud may determine whether a Bluetooth connection to the second earbud is not established when the charging case is closed. If the Bluetooth connection to the second earbud is not established, operation S509 is performed. The first earbud sends the paging request to the terminal 100. If the Bluetooth connection to the second earbud is established, operation S510 is performed. The first earbud sends the paging request to the second earbud.

In an embodiment of this application, the paging request sent by the first earbud to the second earbud may be referred to as a first paging request. The paging request sent by the first earbud to the terminal may be referred to as a second paging request.

When the charging case is closed, there are the following cases of a Bluetooth connection status of the first earbud.

Case 1. Both the first earbud and the second earbud work, and the first earphone is the primary earbud. The first earbud has established the Bluetooth connection to the terminal 100. The first earbud has established the Bluetooth connection to the second earbud.

Case 2. Both the first earbud and the second earbud work, and the first earphone is the secondary earbud. The first earbud has established the Bluetooth connection to the second earbud. The second earbud is the primary earbud, and the second earbud has established the Bluetooth connection to the terminal 100.

Case 3. Only the first earbud works, and the first earbud has established the Bluetooth connection to the terminal 100.

When the first earbud determines that there is only the first earbud in the charging case, the first earbud may determine, based on historical connection information, whether a Bluetooth connection is established to the second earbud when the charging case is closed.

1. If the first earbud determines that the Bluetooth connection is established to the second earbud when the charging case is closed, the first earbud may enter the page state when the charging case is opened, and send the paging request to the second earbud based on a Bluetooth address of the second earbud. If receiving the paging request sent by the first earbud, the second earbud may send a slave device paging response to the first earbud in the next slot. After receiving the paging response sent by the second earbud, the first earbud may initiate the connection request to the second earbud, and the two earbuds may recover the Bluetooth connection. In a connected state, the communication parties: the first earbud and the second earbud hop one frequency channel at a specific time interval (for example, 625 microseconds).

In an embodiment, when the second earbud is not around the first earbud or has no power, the second earbud cannot receive the paging request sent by the first earbud, and does not return a slave device paging response to the first earbud. If the first earbud cannot receive, within preset time (for example, 5.12 s), the slave device paging response returned by the second earbud, the first earbud may stop sending the paging request to the second earbud, and send the paging request to the terminal 100 based on the Bluetooth address of the terminal 100. After receiving the paging request sent by the first earbud, the terminal 100 may return the paging response to the first earbud. After receiving the paging response sent by the terminal 100, the first earbud may initiate a connection to the terminal 100, and the first earbud and the terminal 100 may enter a connected state. In the connected state, the communication parties: the first earbud and the terminal 100 hop one frequency channel at a specific time interval (for example, 625 microseconds). In this case, the Bluetooth connection between the first earbud and the terminal 100 is recovered.

2. If determining that the first earbud does not establish the Bluetooth connection to the second earbud and establishes the Bluetooth connection to only the terminal 100 when the charging case is closed, the first earbud may enter the page state, and send the paging request to the terminal 100 based on the Bluetooth address of the terminal 100. After receiving the paging request sent by the first earbud, the terminal 100 may send the paging response to the first earbud in the next slot. After receiving the paging response sent by the terminal 100, the first earbud may initiate a connection to the terminal 100, and the first earbud and the terminal 100 may enter a connected state. In the connected state, the communication parties: the first earbud and the terminal 100 hop one frequency channel at a specific time interval (for example, 625 microseconds). In this case, the Bluetooth connection between the first earbud and the terminal 100 is recovered.

In an embodiment, when the terminal 100 is not around the first earbud or has disabled a Bluetooth function, the terminal 100 cannot receive the paging request sent by the first earbud, and does not return the paging response to the first earbud. If the first earbud cannot receive, within preset time (for example, 5.12 s), the paging response returned by the terminal 100, the first earbud may stop sending the paging request to the terminal 100, and send the paging request to the second earbud based on the Bluetooth address of the second earbud. After receiving the paging request sent by the first earbud, the second earbud may return the paging response to the first earbud. After receiving the paging response sent by the second earbud, the first earbud may initiate a connection to the second earbud, and the first earbud and the second earbud may enter a connected state. In the connected state, the communication parties: the first earbud and the second earbud hop one frequency channel at a specific time interval (for example, 625 microseconds). In this case, the Bluetooth connection between the first earbud and the second earbud is recovered.

In an embodiment of this application, when the charging case is opened, after the first earbud sends the paging request to the second earbud (where the paging request sent to the second earbud may be referred to as the first paging request), if the first earbud does not receive, within first preset time (for example, 6 seconds), the paging response sent by the second earbud (where the paging response returned by the second earbud may be referred to as a first paging response), the first earbud may switch to sending the paging request to the terminal (where the paging request sent to the terminal may be referred to as the second paging request). In this way, the first earbud can switch to reconnecting to the terminal in a timely manner when reconnecting to the second earbud expires.

When the charging case is opened, the first earbud sends the paging request to the terminal. If the first earbud does not receive, within second preset time (for example, 6 seconds), the paging response (where the paging response returned by the terminal may be referred to as a second paging response) sent by the terminal, the first earbud may switch to sending the paging request to the second earbud. In this way, the first earbud can switch to reconnecting to the second earbud in a timely manner when reconnecting to the terminal expires.

According to the Bluetooth reconnection method provided in this embodiment of this application, when the charging case accommodating only the first earbud is opened, the first earbud may determine whether the first earbud establishes the Bluetooth connection to only the second earbud or establishes the Bluetooth connections to both the second earbud and the terminal 100 when the first earbud is placed into the charging case and the charging case is closed. If the first earbud establishes the Bluetooth connection to only the second earbud or establishes the Bluetooth connections to both the second earbud and the terminal 100 when the charging case is closed, the first earbud preferentially reconnects to the second earbud. If the first earbud establishes the Bluetooth connection to only the terminal 100 when the charging case is closed, the first earbud preferentially reconnects to the terminal 100. In this way, reconnection duration can be reduced, and user experience is improved.

In some application scenarios, the Bluetooth device 200 includes the first earbud and the second earbud. When the Bluetooth device 200 establishes the Bluetooth connection to the terminal 100, the user may set the Bluetooth device 200 to a monaural working mode on the terminal 100. When the Bluetooth device 200 is in the monaural working mode, the terminal 100 may establish a Bluetooth connection to only one earbud (for example, the first earbud) of the Bluetooth device 200. When the charging case accommodating only the first earbud is opened, the first earbud may determine whether a working mode is the monaural working mode. If the working mode is the monaural working mode, the first earbud may preferentially reconnect to the terminal 100 when the charging case is opened. In this way, when the charging case accommodating only one earbud is opened, the earbud in the charging case can quickly reconnect to the terminal 100 through Bluetooth, to improve user experience.

Figure 6:
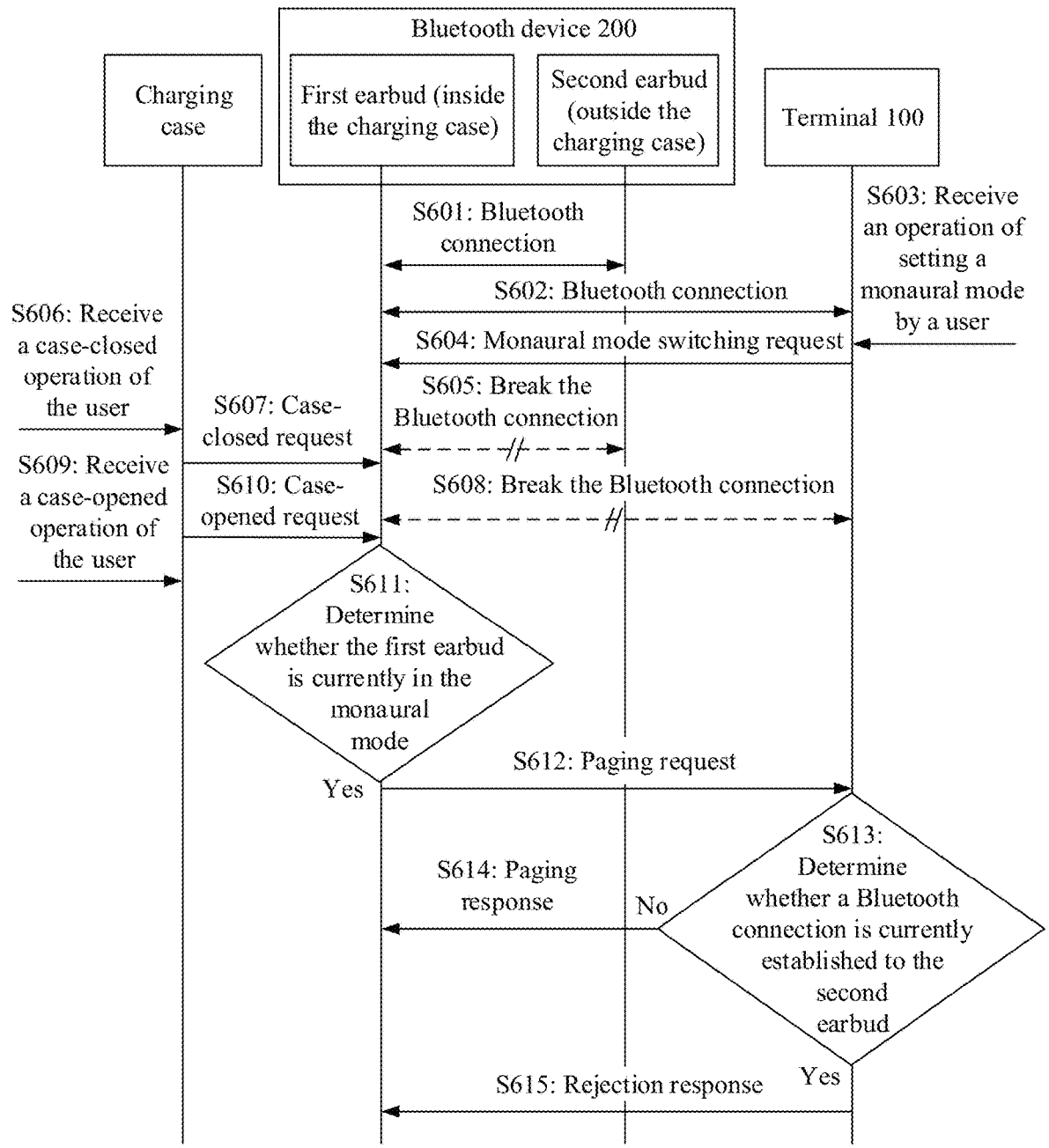
FIG. 6 is a schematic flowchart of a Bluetooth reconnection method according to another embodiment of this application.

FIG. 6 is a schematic flowchart of a Bluetooth reconnection method according to another embodiment of this application. In this embodiment of this application, the Bluetooth device 200 may include a first earbud and a second earbud. The first earbud may be placed into a charging case, and the second earbud is outside the charging case. As shown in FIG. 6, the method includes the following operations.

S601: The first earbud establishes a Bluetooth connection to the second earbud.

S602: The first earbud establishes a Bluetooth connection to a terminal 100.

When the first earbud is a primary earbud and the second earbud is a secondary earbud, the first earbud may first establish the Bluetooth connection to the second earbud, and then, the first earbud establishes the Bluetooth connection to the terminal 100. The Bluetooth connection includes a BR/EDR Bluetooth connection. After the first earbud establishes the Bluetooth connection to the terminal 100 and establishes the Bluetooth connection to the second earbud, the first earbud may store a Bluetooth address (BD_ADDR) of the terminal 100, and the first earbud may send the Bluetooth address of the terminal 100 to the second earbud.

S603: The terminal 100 receives an operation of setting a monaural mode by a user.

S604: In response to the operation of setting the monaural mode, the terminal 100 sends a monaural mode switching request to the first earbud.

Figure 7A:
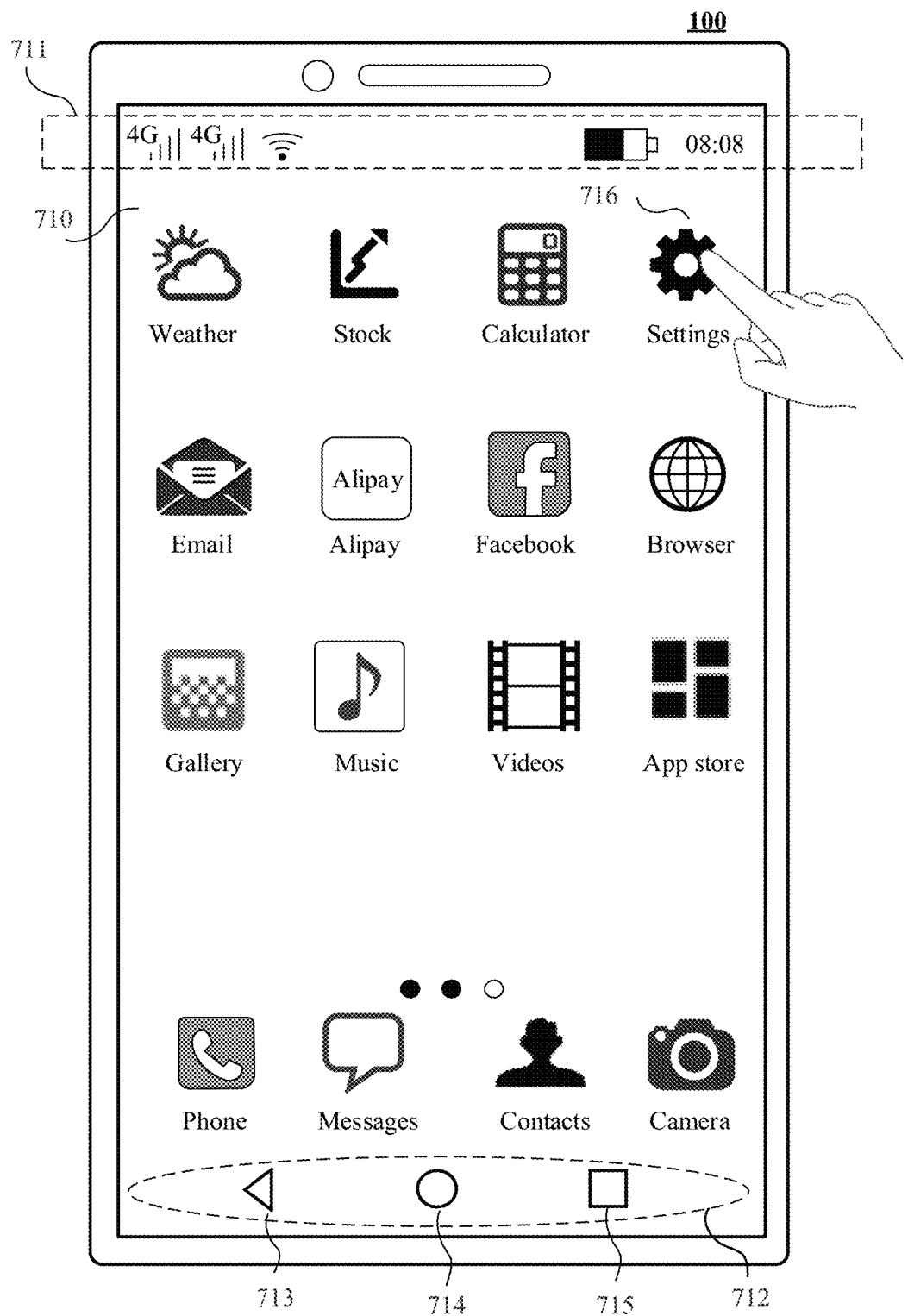
FIG. 7A to FIG. 7F are schematic diagrams of a group of interfaces according to an embodiment of this application.

For example, as shown in FIG. 7A, the terminal 100 displays an interface 710 of a home screen. The interface 710 displays a page on which application icons are placed, and the page includes a plurality of application icons (for example, a Weather icon, a Stock icon, a Calculator icon, a Settings icon 716, an Email icon, an Alipay icon, a Facebook icon, a Browser icon, a Gallery icon, a Music icon, a Videos icon, and an App store icon). A page indicator is further displayed below a plurality of application icons, to indicate a position relationship between a currently displayed page and another page. A plurality of tray icons (for example, a Phone icon, a Messages icon, a Contacts icon, and a Camera icon) are below the page indicator. The tray icons remain displayed when the page is switched, and the page may include a plurality of application icons and page indicators. Alternatively, the page indicator may not be a part of the page and may exist independently, and the tray icon is also optional. This is not limited in this embodiment of this application. A status bar 711 is displayed above the interface 710. The status bar 711 may include one or more signal strength indicators of a mobile communication signal (which may be also referred to as a cellular signal), one or more signal strength indicators of a wireless fidelity (wireless fidelity, Wi-Fi) signal, a battery status indicator, a time indicator, and the like. A navigation bar 712 is displayed below the tray icons. The navigation bar 712 may include system navigation buttons such as a return button 713, a home screen (Home screen) button 714, and an outgoing call task history button 715. When it is detected that the user clicks the return button 713, the terminal 100 may display a previous page of a current page. When it is detected that the user clicks the home screen button 714, the terminal 100 may display the home screen. When it is detected that the user clicks the outgoing call task history button 715, the terminal 100 may display a task that the user has recently opened. Names of the navigation buttons may alternatively be other names. This is not limited in this application. In addition to a virtual button, each navigation button in the navigation bar 712 may be further implemented as a physical button.

Figure 7B:
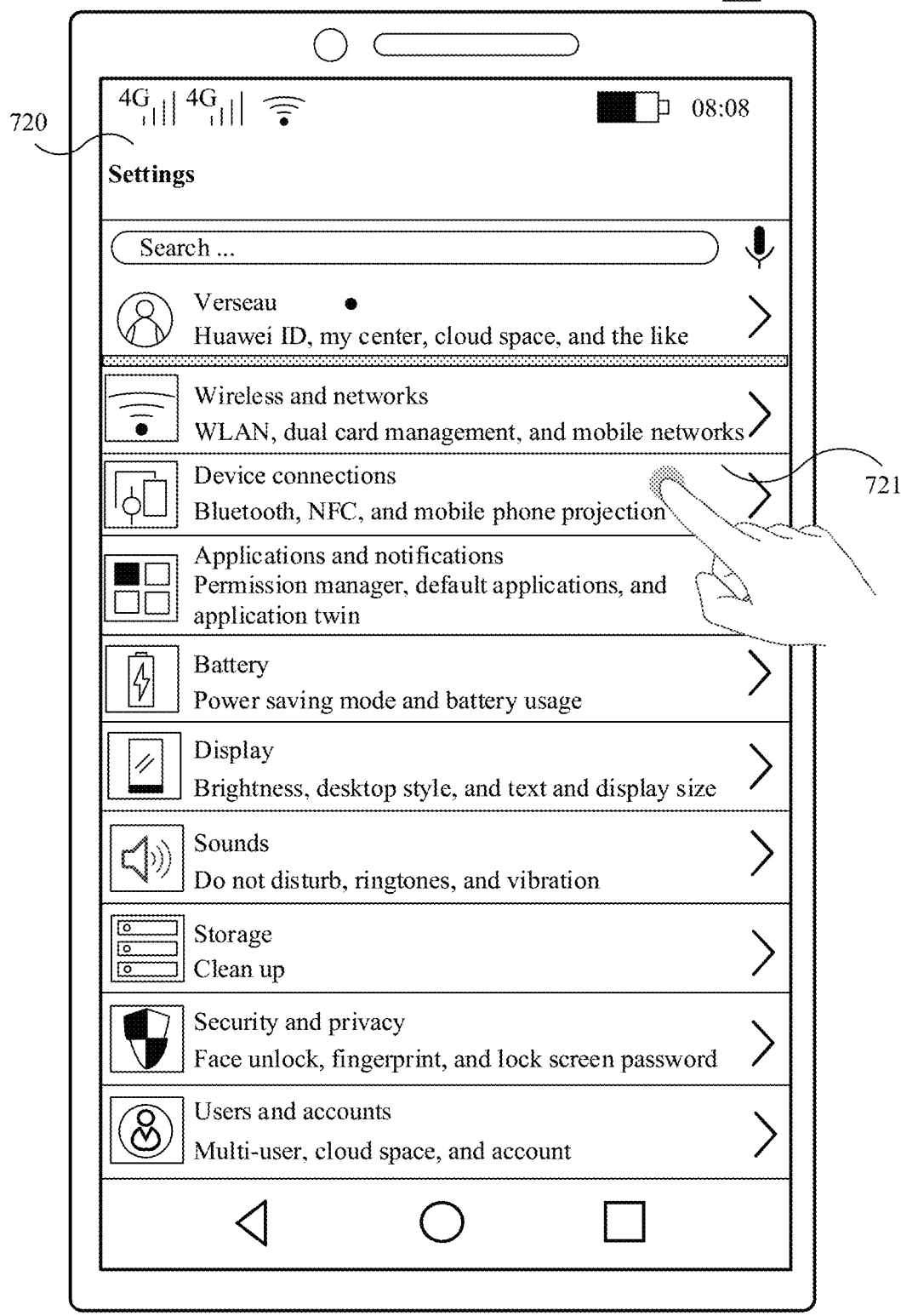

The terminal 100 may receive an input operation (for example, click) of the user for the setting icon 716, and in response to the input operation for the setting icon 716, the terminal 100 may display a setting interface 720 shown in FIG. 7B.

As shown in FIG. 7B, the setting interface 720 displays a wireless and network setting entry, a device connection setting entry 721, an application and notification setting entry, a battery setting entry, a display setting entry, a sound setting entry, a storage setting entry, a security and privacy setting entry, a user and account setting entry, and the like.

Figure 7C:
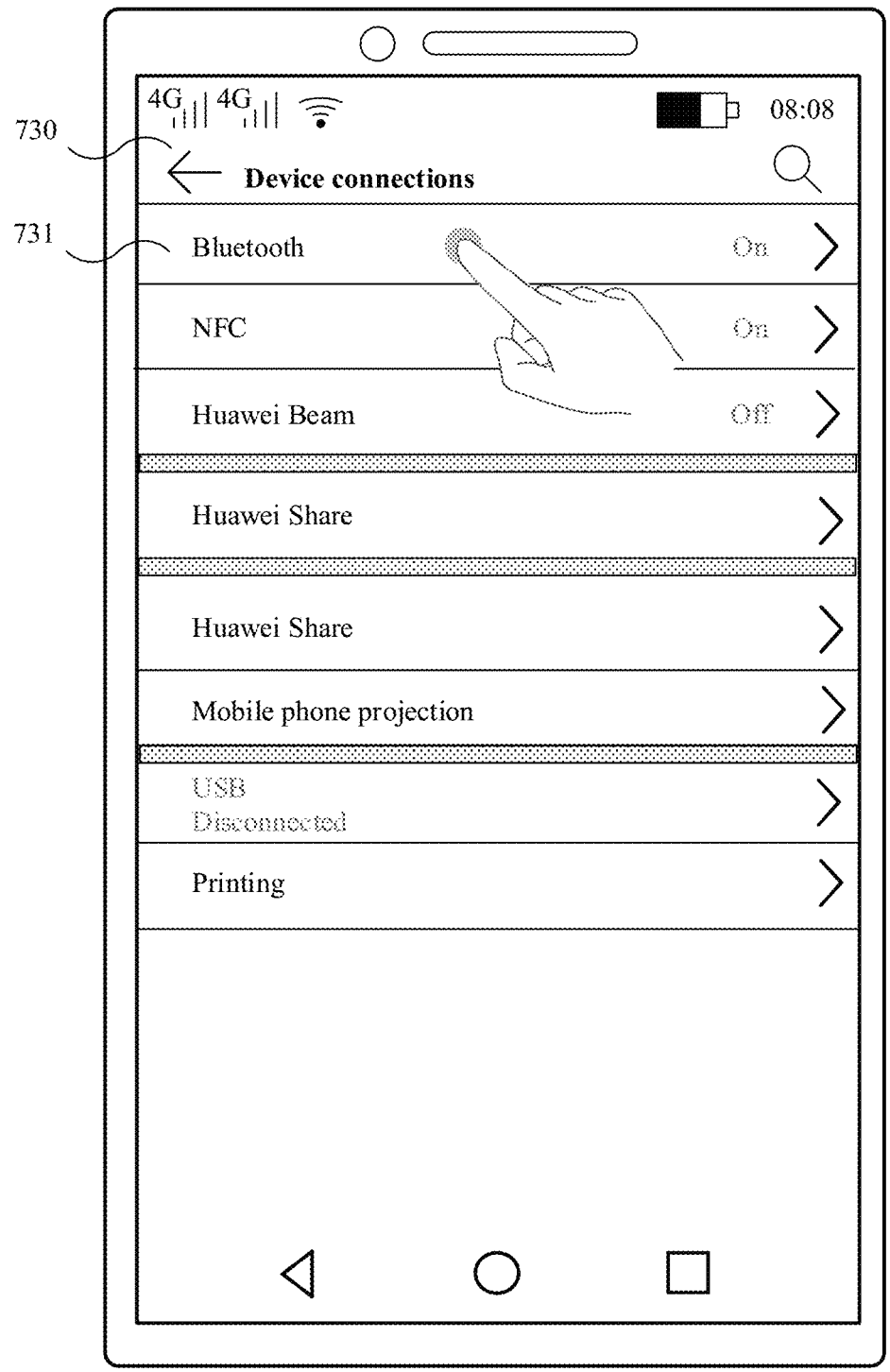

The terminal 100 may receive an input operation (for example, click) of the user for the device connection entry 721, and in response to the input operation for the device connection entry 721, the terminal 100 may display a device connection interface 730 shown in FIG. 7C.

As shown in FIG. 7C, the device connection interface 730 displays a Bluetooth setting entry 731, an NFC setting entry, a Huawei Beam setting entry, a Huawei Share setting entry, a mobile phone projection setting entry, a USB setting entry, a print setting entry, and the like.

Figure 7D:
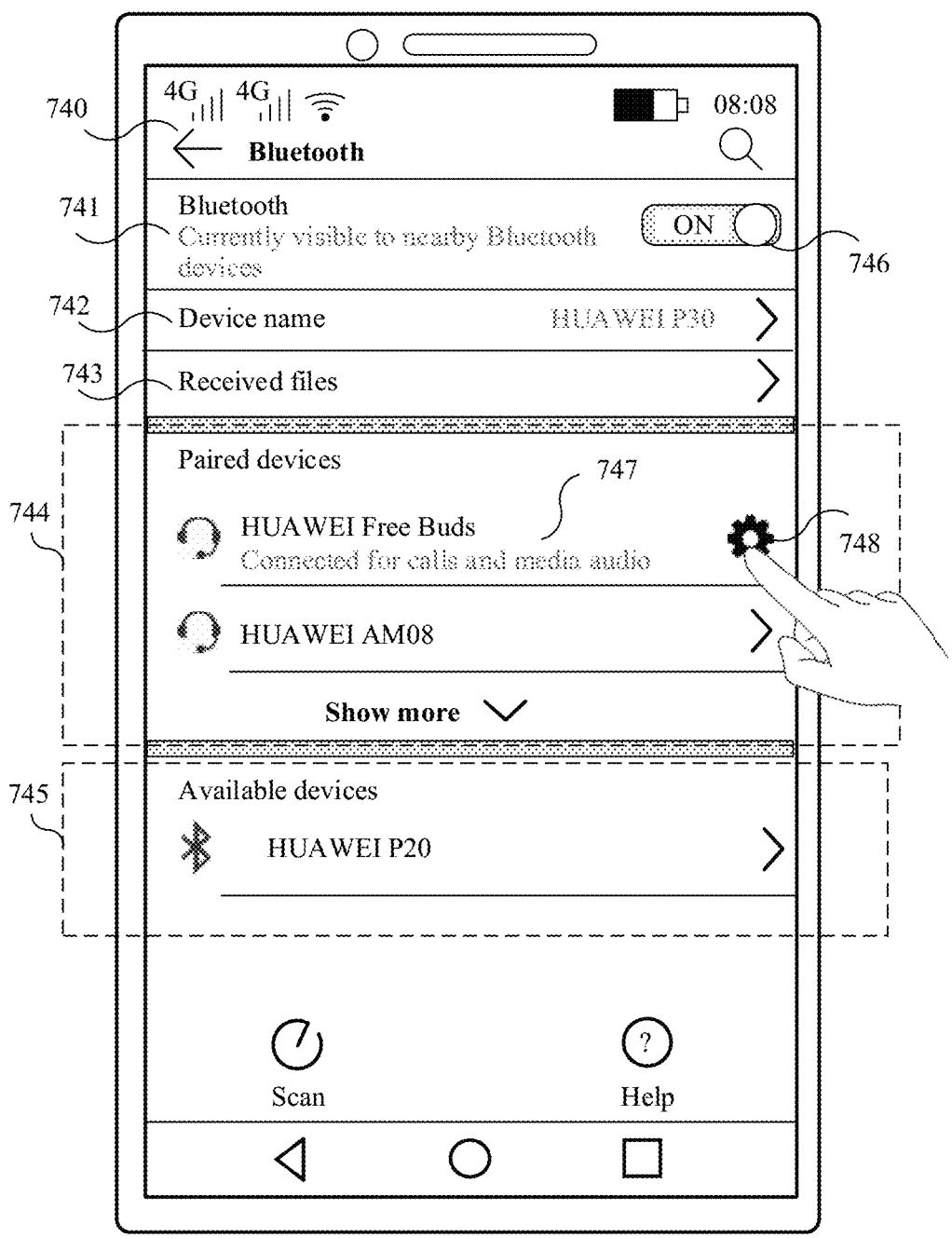

The terminal 100 may receive an input operation of the user for the Bluetooth setting entry 731 on the device connection interface 730, and in response to the input operation for the Bluetooth setting entry 731, the terminal 100 may display the Bluetooth setting interface 740 shown in FIG. 7D.

As shown in FIG. 7D, the Bluetooth setting interface 740 displays a Bluetooth switch entry 741, a device name setting entry 742, a received file setting entry 743, a scanning control, and a help control. The Bluetooth switch entry 741 displays a Bluetooth switch 746. The Bluetooth switch 746 may be used to receive an operation of the user, and trigger the terminal 100 to enable/disable a Bluetooth function. When the Bluetooth switch 746 is turned on, the terminal 100 may display a paired device list 744 and an available device list 745 on the Bluetooth setting interface 740. One or more paired device options may be displayed in the paired list 744 (for example, "HUAWEI Free Buds" device option 747 and "HUAWEI AM08" device option). The terminal 100 has established a connection to the Bluetooth device 200, and the Bluetooth device 200 corresponds to the device option 747. A device name of the Bluetooth device may be "HUAWEI Free Buds". A device setting control 748 may be provided on the device option 747 corresponding to the Bluetooth device 200.

Figure 7E:
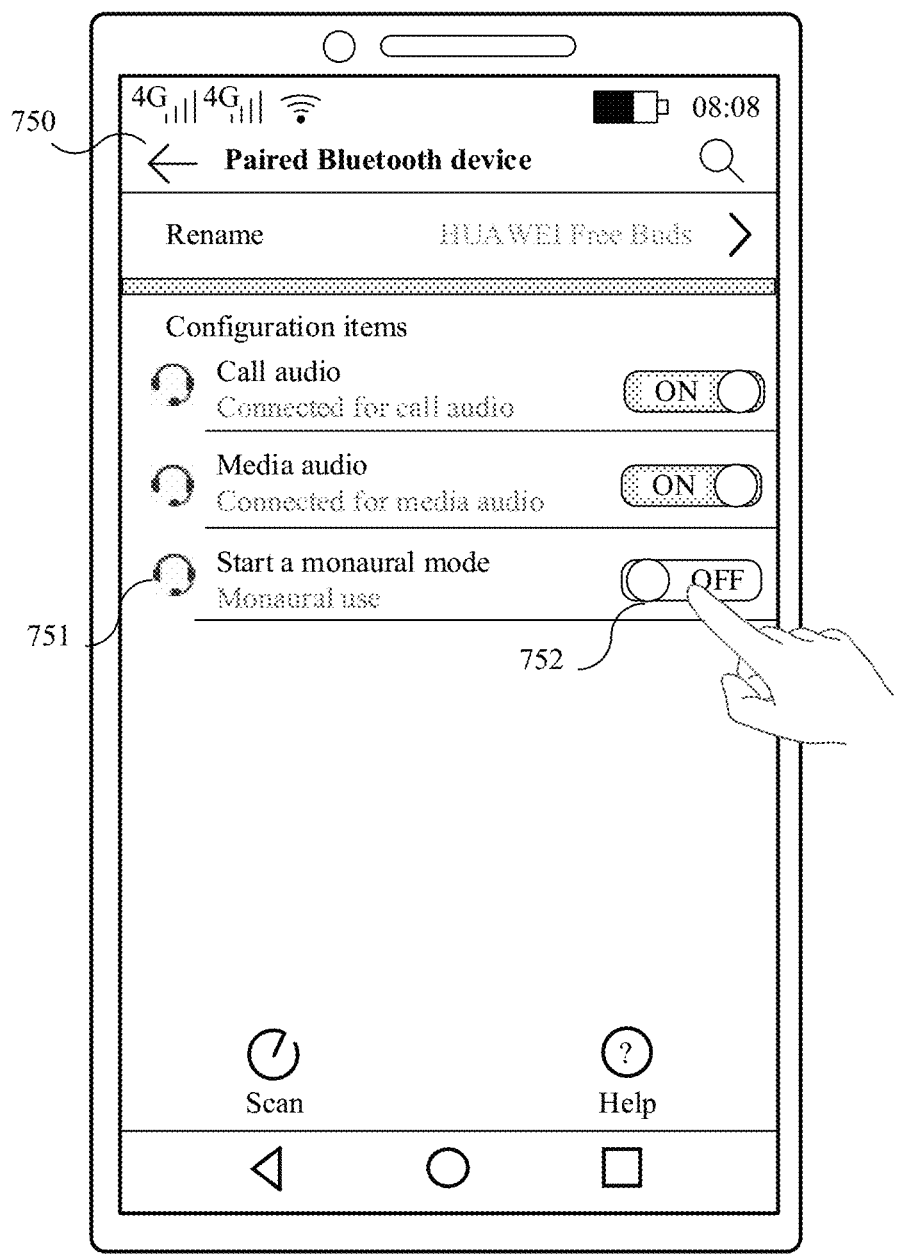

The terminal 100 may receive an input operation (for example, click) of the user for the device setting control 748, and in response to the operation, the terminal 100 may display a device setting interface 750 shown in FIG. 7E.

As shown in FIG. 7E, the setting interface 750 of the device setting interface 200 includes setting options such as a renaming setting option, a call audio setting option, a media audio setting option, and a monaural mode setting option 751. A switch 752 is provided on the monaural mode setting option 751. The switch 752 may be used to trigger the Bluetooth device 200 to enter a monaural working mode.

The terminal 100 may receive an opening operation (for example, click) of the user for the switch 752, and in response to the opening operation, the terminal 100 sends a monaural mode switching request to the Bluetooth device 200, to request the Bluetooth device 200 to enter the monaural mode.

Figure 7F:
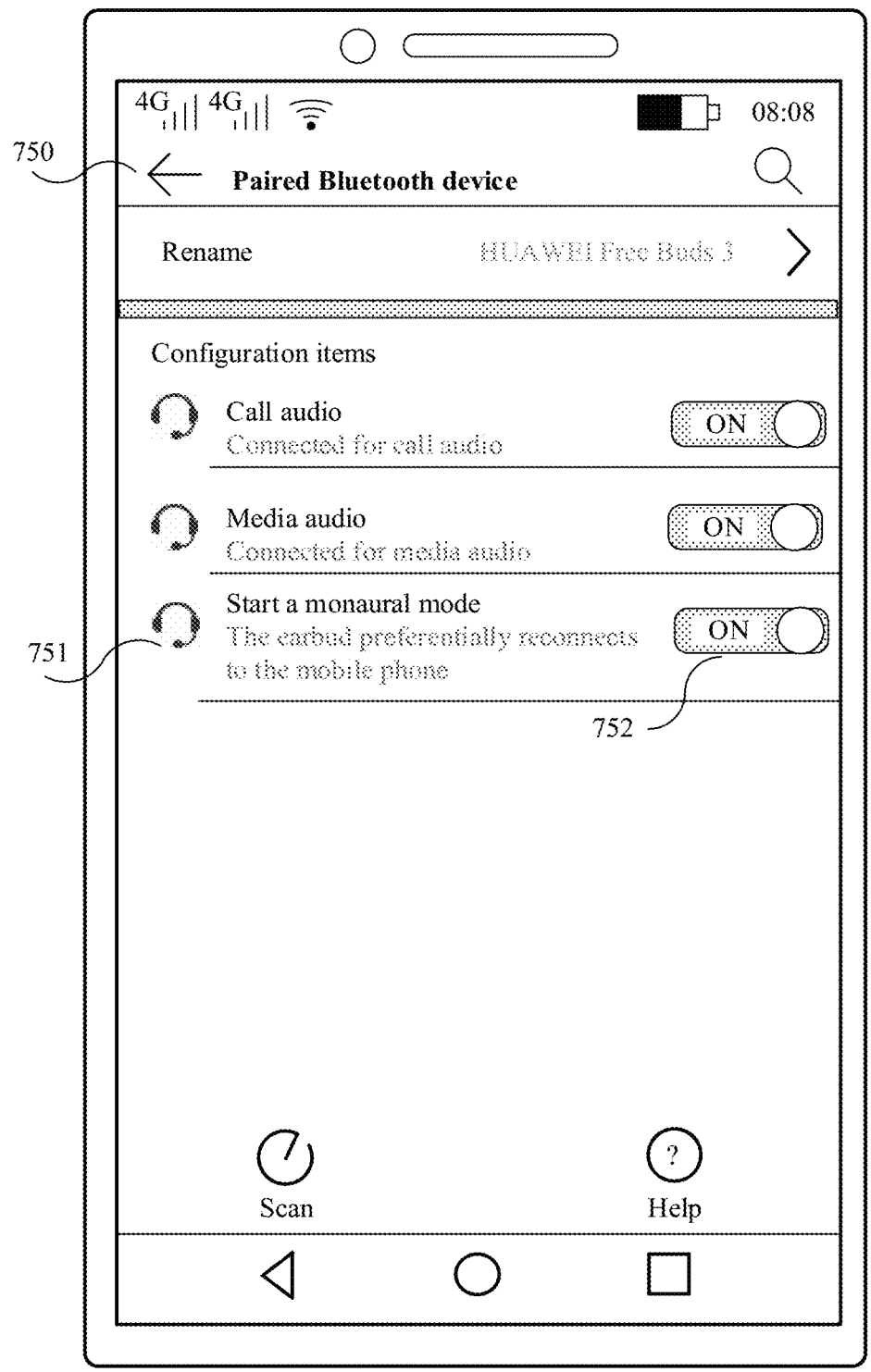

As shown in FIG. 7F, after the terminal 100 receives the opening operation of the user for the switch 752, the switch 752 for the monaural mode may be in an open state.

The first earbud in the Bluetooth device 200 serves as the primary earbud and establishes the Bluetooth connection to the terminal 100. Therefore, the monaural mode switching request sent by the terminal 100 to the Bluetooth device 200 may be that the terminal 100 sends the monaural mode switching request to the first earbud.

S605: The first earbud disconnects from the second earbud after receiving the monaural mode switching request.

After receiving the monaural mode switching request of the terminal 100, the first earbud enters the monaural mode, and notifies the second earbud to enter the monaural mode. Then, the first earbud breaks the Bluetooth connection to the second earbud.

In some embodiments, the first earbud is the secondary earbud, the second earbud is the primary earbud, the second earbud establishes the Bluetooth connection to the terminal 100, and the first earbud establishes the Bluetooth connection to the second earbud. After receiving the operation of setting the monaural mode by the user, the terminal 100 may send the monaural mode switching request to the second earbud. After receiving the monaural mode switching request sent by the terminal 100, the second earbud may first switch to the monaural mode, and notify the first earbud to switch to the monaural mode. Then, the second earbud disconnects from the first earbud. Because both the first earbud and the second earbud have entered the monaural mode, when Bluetooth reconnection is performed, both the first earbud and the second earbud select to send the paging request to the terminal 100.

S606: The charging case receives a case-closed operation of the user.

When only the first earbud is placed into the charging case, the charging case may receive the case-closed operation of the user. A physical switch may be disposed on the charging case, and the physical switch may be used to detect whether the charging case is in a closed state. When the user closes the charging case, the physical switch on the charging case is triggered to switch to the closed state. The charging case may detect, through the physical switch, the case-closed operation of the user. In this embodiment of this application, the charging case may detect the case-closed operation of the user through, but not limited to, the physical switch, and may alternatively detect the case-closed operation of the user through some sensors (such as a magnetic sensor or a proximity sensor). This is not limited herein.

S607: The charging case sends a case-closed request to the first earbud.

When the first earbud is placed into the charging case, there is an electrical connection between the first earbud and the charging case. The charging case may send the case-closed request to the first earbud through the electrical connection.

S608: The first earbud breaks the Bluetooth connection to the terminal 100.

After receiving the case-closed request sent by the charging case, the first earbud may send a disconnection request to the terminal 100, to break the Bluetooth connection to the terminal 100.

S609: The charging case receives a case-opened operation of the user.

The physical switch may be disposed on the charging case, and the physical switch may be used to detect whether the charging case is in an opened state. When the user opens the charging case, the physical switch on the charging case is triggered to switch to the opened state. The charging case may detect, through the physical switch, the case-opened operation of the user. In this embodiment of this application, the charging case may detect the case-opened operation of the user through, but not limited to, the physical switch, and may alternatively detect the case-opened operation of the user through some sensors (such as a magnetic sensor or a proximity sensor). This is not limited herein.

S610: The charging case sends a case-opened request to the first earbud.

When the first earbud is placed into the charging case, there is the electrical connection between the first earbud and the charging case. The charging case may send the case-opened request to the first earbud through the electrical connection.

S611: After receiving the case-opened request sent by the terminal 100, the first earbud may determine whether the first earbud is currently in the monaural mode. If the first earbud is currently in the monaural mode, S612 in which the first earbud sends the paging request to the terminal 100 is performed. If the first earbud is not in the monaural mode, the first earbud may send the paging request to the second earbud.

Before the first earbud is placed into the charging case, the user has set the two earbuds of the Bluetooth device 200 to the monaural working mode on the terminal 100. Therefore, when the first earbud detects that the charging case is opened, the first earbud may send the paging request to the terminal 100.

S613: After receiving the paging request sent by the first earbud, the terminal 100 may determine whether the terminal 100 is currently connected to the second earbud. If the terminal 100 is not currently connected to the second earbud, operation S614 in which the terminal 100 may send a paging response to the first earbud is performed. If the terminal 100 is currently connected to the second earbud, operation S615 in which the terminal 100 may send a rejection response to the first earbud is performed.

In a possible case, when the charging case is closed, after the first earbud breaks the Bluetooth connection to the terminal 100, because the second earbud has also entered the monaural mode and normally works outside the charging case, the second earbud may enter a page state, and send the paging request to the terminal 100 based on the Bluetooth address of the terminal 100. If receiving the paging request sent by the second earbud, the terminal 100 may send a paging response to the second earbud in a next slot. After receiving the paging response sent by the terminal 100, the second earbud may initiate a connection to the terminal 100, and the second earbud and the terminal 100 may enter a connected state. In the connected state, the communication parties: the second earbud and the terminal 100 hop one frequency channel at a specific time interval (for example, 625 microseconds). In this case, the Bluetooth connection between the second earbud and the terminal 100 is recovered. In this case, the second earbud has established the Bluetooth connection to the terminal 100, and the second earbud works in the monaural mode. The second earbud rejects the paging request of the first earbud, and the terminal 100 cannot establish the Bluetooth connection to the first earbud.

When the terminal 100 receives the paging request sent by the first earbud, the terminal 100 may determine whether the Bluetooth connection to the second earbud is currently established. If the terminal 100 does not currently establish the Bluetooth connection to the second earbud, the terminal 100 may send a paging response to the first earbud. After receiving the paging response of the terminal 100, the first earbud may initiate a connection to the terminal 100, and the first earbud and the terminal 100 may enter a connected state. In the connected state, the communication parties: the first earbud and the terminal 100 hop one frequency channel at a specific time interval (for example, 625 microseconds). In this case, the Bluetooth connection between the first earbud and the terminal 100 is recovered.

When the terminal 100 receives the paging request sent by the first earbud, the terminal 100 may determine whether the Bluetooth connection to the second earbud is currently established. If the terminal 100 has currently established the Bluetooth connection to the second earbud, the terminal 100 may send a rejection response to the first earbud. After receiving the rejection response sent by the terminal 100, the first earbud may exit the page state, and stop sending a query request to the terminal 100.

The foregoing embodiments are merely intended to describe the technical solutions of this application, but are not to limit this application. Although this application is described in detail with reference to the foregoing embodiments, persons of ordinary skill in the art should understand that they may still make modifications to the technical solutions described in the foregoing embodiments or make equivalent replacements to some technical features thereof without departing from the scope of the technical solutions of embodiments of this application.

What is claimed is:

1. A Bluetooth reconnection method, performed by a Bluetooth system comprising a terminal, a first earbud, a second earbud, and a charging case, and the method comprising:
when the charging case is closed, terminating, by the first earbud, a Bluetooth connection, wherein the first earbud stores a Bluetooth address of the terminal and a Bluetooth address of the second earbud; and
when the charging case is opened, the charging case contains only the first earbud, and there is a Bluetooth connection between the first earbud and the second earbud, sending, by the first earbud, a first paging request to the second earbud based on the Bluetooth address of the second earbud.

2. The method according to claim 1, further comprising:
when the charging case is opened, the charging case contains only the first earbud, and there is no Bluetooth connection between the first earbud and the second earbud, sending, by the first earbud, a second paging request to the terminal based on the Bluetooth address of the terminal.

3. The method according to claim 1, wherein the further comprising:
when the charging case is opened, the charging case contains the first earbud, and the first earbud is in a monaural working mode, sending, by the first earbud, a second paging request to the terminal based on the Bluetooth address of the terminal.

4. The method according to claim 1, further comprising:
when the charging case is opened and the charging case contains the first earbud and the second earbud, sending, by the first earbud, the first paging request to the second earbud based on the Bluetooth address of the second earbud.

5. The method according to claim 1, further comprising:
when the charging case is opened and the charging case contains the first earbud and a third earbud, sending, by the first earbud, a second paging request to the terminal based on the Bluetooth address of the terminal, wherein the first earbud is not paired with the third earbud.

6. The method according to claim 1, wherein after sending the first paging request to the second earbud based on the Bluetooth address of the second earbud, the method further comprises:
when the first earbud does not receive, within first preset time, a first paging response sent by the second earbud, sending, by the first earbud, a second paging request to the terminal based on the Bluetooth address of the terminal.

7. The method according to claim 2, wherein after sending the second paging request to the terminal based on the Bluetooth address of the terminal, the method further comprises:
when the first earbud does not receive, within second preset time, a second paging response sent by the terminal, sending, by the first earbud, the first paging request to the second earbud based on the Bluetooth address of the second earbud.

8. A Bluetooth system, comprising:
a terminal, a first earbud, a second earbud, and a charging case, wherein the first earbud is configured to:
when the charging case is closed, terminate a Bluetooth connection, wherein the first earbud stores a Bluetooth address of the terminal and a Bluetooth address of the second earbud; and
when the charging case is opened, the charging case contains only the first earbud, and there is a Bluetooth connection between the first earbud and the second earbud, send a first paging request to the second earbud based on the Bluetooth address of the second earbud.

9. The Bluetooth system according to claim 8, wherein the first earbud is further configured to:
when the charging case is opened, the charging case contains only the first earbud, and there is no Bluetooth connection between the first earbud and the second earbud, send a second paging request to the terminal based on the Bluetooth address of the terminal.

10. The Bluetooth system according to claim 8, wherein the first earbud is further configured to:
when the charging case is opened, the charging case contains the first earbud, and the first earbud is in a monaural working mode, send a second paging request to the terminal based on the Bluetooth address of the terminal.

11. The Bluetooth system according to claim 8, wherein the first earbud is further configured to:
when the charging case is opened and the charging case contains the first earbud and the second earbud, send the first paging request to the second earbud based on the Bluetooth address of the second earbud.

12. The Bluetooth system according to claim 8, wherein the first earbud is further configured to:
when the charging case is opened and the charging case contains the first earbud and a third earbud, send a second paging request to the terminal based on the Bluetooth address of the terminal, wherein the first earbud is not paired with the third earbud.

13. The method according to claim 8, wherein the first earbud is further configured to:
after sending the first paging request to the second earbud based on the Bluetooth address of the second earbud, when the first earbud does not receive, within first preset time, a first paging response sent by the second earbud, send a second paging request to the terminal based on the Bluetooth address of the terminal.

14. The method according to claim 9, wherein the first earbud is further configured to:
after sending the second paging request to the terminal based on the Bluetooth address of the terminal, when the first earbud does not receive, within second preset time, a second paging response sent by the terminal, send the first paging request to the second earbud based on the Bluetooth address of the second earbud.

15. An earbud operating as a first earbud, comprising:
a Bluetooth chip storing a Bluetooth address of a terminal and a Bluetooth address of a second earbud; and
a processor is configured to:
when a charging case is closed, instructs the Bluetooth chip to terminate a Bluetooth connection, and
when the charging case is opened, the charging case contains only the first earbud, and there is a Bluetooth connection between the first earbud and the second earbud, instruct the Bluetooth chip to send a first paging request to the second earbud based on the Bluetooth address of the second earbud.

16. The earbud according to claim 15, wherein the processor is further configured to:
when the charging case is opened, the charging case contains only the first earbud, and there is no Bluetooth connection between the first earbud and the second earbud, instruct the Bluetooth chip to send a second paging request to the terminal based on the Bluetooth address of the terminal.

17. The earbud according to claim 15, wherein the processor is further configured to:
when the charging case is opened, the charging case contains the first earbud, and the first earbud is in a monaural working mode, instruct the Bluetooth chip to send a second paging request to the terminal based on the Bluetooth address of the terminal.

18. The earbud according to claim 15, wherein the processor is further configured to:
when the charging case is opened and the charging case contains the first earbud and the second earbud, instruct the Bluetooth chip to send the first paging request to the second earbud based on the Bluetooth address of the second earbud.

19. The earbud according to claim 15, wherein the processor is further configured to:
when the charging case is opened and the charging case contains the first earbud and a third earbud, indicate the Bluetooth chip to send a second paging request to the terminal based on the Bluetooth address of the terminal, wherein the first earbud is not paired with the third earbud.

20. The earbud according to claim 15, wherein the Bluetooth chip is further configured to:
after sending the first paging request to the second earbud based on the Bluetooth address of the second earbud, when the Bluetooth chip does not receive, within first preset time, a first paging response sent by the second earbud, send a second paging request to the terminal based on the Bluetooth address of the terminal.

* * * * *